(12) United States Patent
DiDomenico

(10) Patent No.: US 10,381,731 B2
(45) Date of Patent: Aug. 13, 2019

(54) AERIAL CAMERA SYSTEM, METHOD FOR IDENTIFYING ROUTE-RELATED HAZARDS, AND MICROSTRIP ANTENNA

(71) Applicant: General Electric Company, Schenectady, NY (US)

(72) Inventor: Dale Martin DiDomenico, Melbourne, FL (US)

(73) Assignee: GE Global Sourcing LLC, Norwalk, CT (US)

( * ) Notice: Subject to any disclaimer, the term of this patent is extended or adjusted under 35 U.S.C. 154(b) by 0 days.

(21) Appl. No.: 15/819,877

(22) Filed: Nov. 21, 2017

(65) Prior Publication Data

US 2018/0097288 A1   Apr. 5, 2018

Related U.S. Application Data

(63) Continuation-in-part of application No. 14/624,069, filed on Feb. 17, 2015, now Pat. No. 9,873,442, which
(Continued)

(51) Int. Cl.
*B64C 1/36* (2006.01)
*G05D 1/00* (2006.01)
(Continued)

(52) U.S. Cl.
CPC .......... *H01Q 9/0407* (2013.01); *B61L 23/041* (2013.01); *B61L 23/042* (2013.01);
(Continued)

(58) Field of Classification Search
None
See application file for complete search history.

(56) References Cited

U.S. PATENT DOCUMENTS 5,844,523 A * 12/1998 Brennan ................ H01Q 1/22
343/700 MS
7,636,063 B2 * 12/2009 Channabasappa ... H01Q 9/0442
343/700 MS
(Continued)

FOREIGN PATENT DOCUMENTS

WO   WO 2012150591   11/2012

OTHER PUBLICATIONS

Examination Report for No. 1 for standard patent application for AU 2015217535, dated Jun. 5, 2019.

*Primary Examiner* — Howard Williams
(74) *Attorney, Agent, or Firm* — Joseph M Butscher; The Small Patent Law Group, LLC

(57) ABSTRACT

An aerial device can be configured to fly above a route during movement of a vehicle along the route, such as for purposes of capturing image data of the route. The aerial device may include a microstrip antenna. The antenna includes a radiating patch layer, an aperture layer, a first insulator layer, a feed line, and a second insulator layer, all of which are parallel to and stacked on top of one another. The aperture layer is conductive and defines an aperture. The first insulator layer is sandwiched between the radiating patch layer and the aperture layer; thereby, the radiating patch layer and the aperture layer are spaced apart from one another by at least a thickness of the first insulator layer. The first insulator layer has a low dielectric constant. The second insulator layer is sandwiched between the aperture layer and the feed line.

20 Claims, 20 Drawing Sheets

Related U.S. Application Data is a continuation-in-part of application No. 14/541,370, filed on Nov. 14, 2014, now Pat. No. 10,110,795, which is a continuation-in-part of application No. 14/485,398, filed on Sep. 12, 2014, now Pat. No. 10,049,298, and a continuation-in-part of application No. 14/479,847, filed on Sep. 8, 2014, now abandoned, and a continuation-in-part of application No. 14/457,353, filed on Aug. 12, 2014, and a continuation-in-part of application No. 14/253,294, filed on Apr. 15, 2014, now Pat. No. 9,875,414, and a continuation-in-part of application No. 14/217,672, filed on Mar. 18, 2014.

(60) Provisional application No. 62/425,043, filed on Nov. 21, 2016, provisional application No. 61/940,813, filed on Feb. 17, 2014, provisional application No. 61/940,610, filed on Feb. 17, 2014, provisional application No. 61/940,660, filed on Feb. 17, 2014, provisional application No. 61/940,696, filed on Feb. 17, 2014, provisional application No. 61/940,813, filed on Feb. 17, 2014.

(51) Int. Cl.

| | | |
|---|---|---|
| *G06K 9/00* | (2006.01) | |
| *H01Q 1/22* | (2006.01) | |
| *H01Q 1/27* | (2006.01) | |
| *H01Q 9/04* | (2006.01) | |
| *H04N 7/18* | (2006.01) | |
| *B61L 23/04* | (2006.01) | |
| *B64C 39/02* | (2006.01) | |
| *B64D 47/08* | (2006.01) | |
| *H04N 5/232* | (2006.01) | |

(52) U.S. Cl.
CPC .............. *B64C 1/36* (2013.01); *B64C 39/024* (2013.01); *B64D 47/08* (2013.01); *G05D 1/0094* (2013.01); *G06K 9/0063* (2013.01); *G06K 9/00791* (2013.01); *H01Q 1/22* (2013.01); *H01Q 1/27* (2013.01); *H04N 5/23203* (2013.01); *H04N 5/23206* (2013.01); *H04N 5/23241* (2013.01); *H04N 5/23245* (2013.01); *B64C 2201/021* (2013.01); *B64C 2201/123* (2013.01); *B64C 2201/127* (2013.01); *B64C 2201/208* (2013.01); *H04N 7/185* (2013.01)

(56) References Cited

U.S. PATENT DOCUMENTS

| | | | |
|---|---|---|---|
| 2004/0239567 A1* | 12/2004 | Van Der Poel | H01Q 9/0414 343/700 MS |
| 2008/0128563 A1 | 6/2008 | Kumar | |
| 2011/0103293 A1* | 5/2011 | Gale | H04W 4/046 370/315 |
| 2015/0063202 A1* | 3/2015 | Mazzarella | H04W 4/90 370/316 |

* cited by examiner

AERIAL CAMERA SYSTEM, METHOD FOR IDENTIFYING ROUTE-RELATED HAZARDS, AND MICROSTRIP ANTENNA

CROSS-REFERENCE TO RELATED APPLICATIONS

This application claims priority to U.S. Provisional Application No. 62/425,043 filed 21 Nov. 2016, and is a continuation-in-part of U.S. application Ser. No. 14/624,069, filed 17 Feb. 2015.

U.S. application Ser. No. 14/624,069 claims priority to U.S. Provisional Application Nos. 61/940,813; 61/940,660; 61/940610; and 61/940,696, all of which were filed on 17 Feb. 2014. U.S. application Ser. No. 14/624,069 also is a continuation-in-part of U.S. patent application Ser. No. 14/541,370, which was filled on 14 Nov. 2014, and which claims priority to U.S. Provisional Application No. 61/940,813 filed on 17 Feb. 2014. U.S. patent application Ser. No. 14/541,370 is a continuation-in-part of U.S. patent application Ser. No. 14/217,672, which was filed on 18 Mar. 2014; U.S. patent application Ser. No. 14/253,294, which was filed on 15 Apr. 2014; U.S. patent application Ser. No. 14/457,353, which was filed on 12 Aug. 2014; U.S. patent application Ser. No. 14/479,847, which was filed on 8 Sep. 2014; and U.S. patent application Ser. No. 14/485,398, which was filed on 12 Sep. 2014.

The entire disclosures of all the above applications are incorporated herein by reference.

FIELD

Embodiments of the subject matter disclosed herein relate to obtaining and communicating image data and/or video data using one or more aerial devices; the data may be associated with equipment of a transportation network. Other embodiments relate to antennas, e.g., for use in wirelessly communicating with aerial devices.

BACKGROUND

Equipment may be sometimes outfitted with camera units for capturing and storing video data of the environment around a vehicle. For example, law enforcement vehicles may be provided with "dashboard cams" to record a view out the front windshield of the vehicle, to capture video data of interactions between a law enforcement officer and (for example) the occupants of another vehicle. As another example, passenger automobiles may be provided with fixed-position rear view cameras for capturing a video stream of the region directly behind the automobile, which is displayed on a console display screen to aid the driver in safely backing up.

In addition to in-vehicle cameras, transportation networks (referring to infrastructure for movement of vehicles, e.g., railroad track networks for rail vehicles, or highway and other road networks for automobiles, semi-trailer trucks, and other on-highway vehicles) are sometimes outfitted with wayside cameras for capturing video data of the transportation network. For example, a camera may be affixed to a mast at the side of a highway, to capture video data of the highway for traffic tracking and reporting purposes.

Certain systems (e.g., unmanned aerial vehicles) may be configured for the wireless transmission of camera data (e.g., video data or other image data) from a camera to an off-board or other location away from the camera. For this purpose, the system is provided with an antenna and a transmitter. Other unmanned aerial vehicles may use antennas to transmit electromagnetic signals to detect a characteristic of the environment external to the vehicle. Current antennas are bulky and transmit data at relatively low bandwidths. This may result in signal "collisions" and/or limitations on how much and what type of data is captured. It may be desirable to have an antenna that is smaller/lighter and higher bandwidth than existing antennas.

BRIEF DESCRIPTION

In one embodiment, a system (e.g., an aerial camera system) includes a first aerial device, a first camera unit, and one or more image analysis processors. The first aerial device is configured to be disposed onboard a non-aerial vehicle as the non-aerial vehicle moves along a route. The first aerial device also can be configured to fly above the route during movement of the vehicle along the route. The first camera unit is configured to be disposed onboard the first aerial device and to generate first image data during flight of the first aerial device. The one or more image analysis processors are configured to examine the first image data and to identify a hazard disposed ahead of the non-aerial vehicle along a direction of travel of the non-aerial vehicle based on the first image data.

In another embodiment, a method (e.g., a method for identifying route-related hazards) includes generating first image data from a first camera unit disposed onboard a first aerial device that is configured to land on a non-aerial vehicle during movement of the non-aerial vehicle along a route. The first image data can be generated during flight of the first aerial device above the route being traveled by the non-aerial vehicle. The method also can include examining (using one or more image analysis processors) the first image data to identify a hazard disposed ahead of the non-aerial vehicle along a direction of travel of the non-aerial vehicle based on the first image data.

In another embodiment, another system (e.g., another camera system) includes a first aerial device configured to land and dock to a non-aerial vehicle as the non-aerial vehicle moves along a route. The first aerial device also can be configured to fly off of the non-aerial vehicle and fly ahead of the non-aerial vehicle along a direction of travel of the non-aerial vehicle along the route. The system also can include a first camera unit configured to be disposed onboard the first aerial device and to generate first image data representative of a portion of the route ahead of the non-aerial vehicle during movement of the non-aerial vehicle along the route. The system also can include a second aerial device configured to land and dock to the non-aerial vehicle as the non-aerial vehicle moves along a route. The second aerial device also can be configured to fly off of the non-aerial vehicle and fly ahead of the non-aerial vehicle along the direction of travel of the non-aerial vehicle along the route. A second camera unit configured to be disposed onboard the second aerial device and to generate second image data representative of the portion of the route ahead of the non-aerial vehicle during movement of the non-aerial vehicle along the route also can be included in the system. The system can include one or more image analysis processors configured to be disposed onboard the non-aerial vehicle and to receive the first image data and the second image data. The one or more image analysis processors can be configured to identify a hazard along the route ahead of the non-aerial vehicle.

In another embodiment, an antenna (e.g., for use in a system as described above, as part of an aerial vehicle communication system or otherwise) includes a radiating patch layer, an aperture layer, a first insulator layer, a feed line, and a second insulator layer, all of which are parallel to and stacked on top of one another. The aperture layer is conductive and defines an aperture. The first insulator layer is sandwiched between the radiating patch layer and the aperture layer; thereby, the radiating patch layer and the aperture layer are spaced apart from one another by at least a thickness of the first insulator layer. The first insulator layer has a low dielectric constant. The second insulator layer is sandwiched between the aperture layer and the feed line.

In another embodiment, an antenna (e.g., for use in a system as described above, as part of an aerial vehicle communication system or otherwise) includes a radiating patch layer, an aperture layer, a first insulator layer, a conductive feed line, a second insulator layer, a ground plane layer, and a third insulator layer, which are parallel to and stacked on top of one another. The aperture layer is conductive and defines an aperture. The first insulator layer is sandwiched between the radiating patch layer and the aperture layer; thereby, the radiating patch layer and the aperture layer are spaced apart from one another by at least a thickness of the first insulator layer. The second insulator layer is sandwiched between the aperture layer and the feed line, and the third insulator layer is sandwiched between the feed line and the ground plane layer. The first insulator layer has a low dielectric constant, and the third insulator layer also has a low dielectric constant, which may be the same as or different from the low dielectric constant of the first insulator layer (i.e., the first and third insulator materials may be the same material, or different materials that both have respective low dielectric constants). The antenna may also include a radome covering at least the radiating patch layer.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
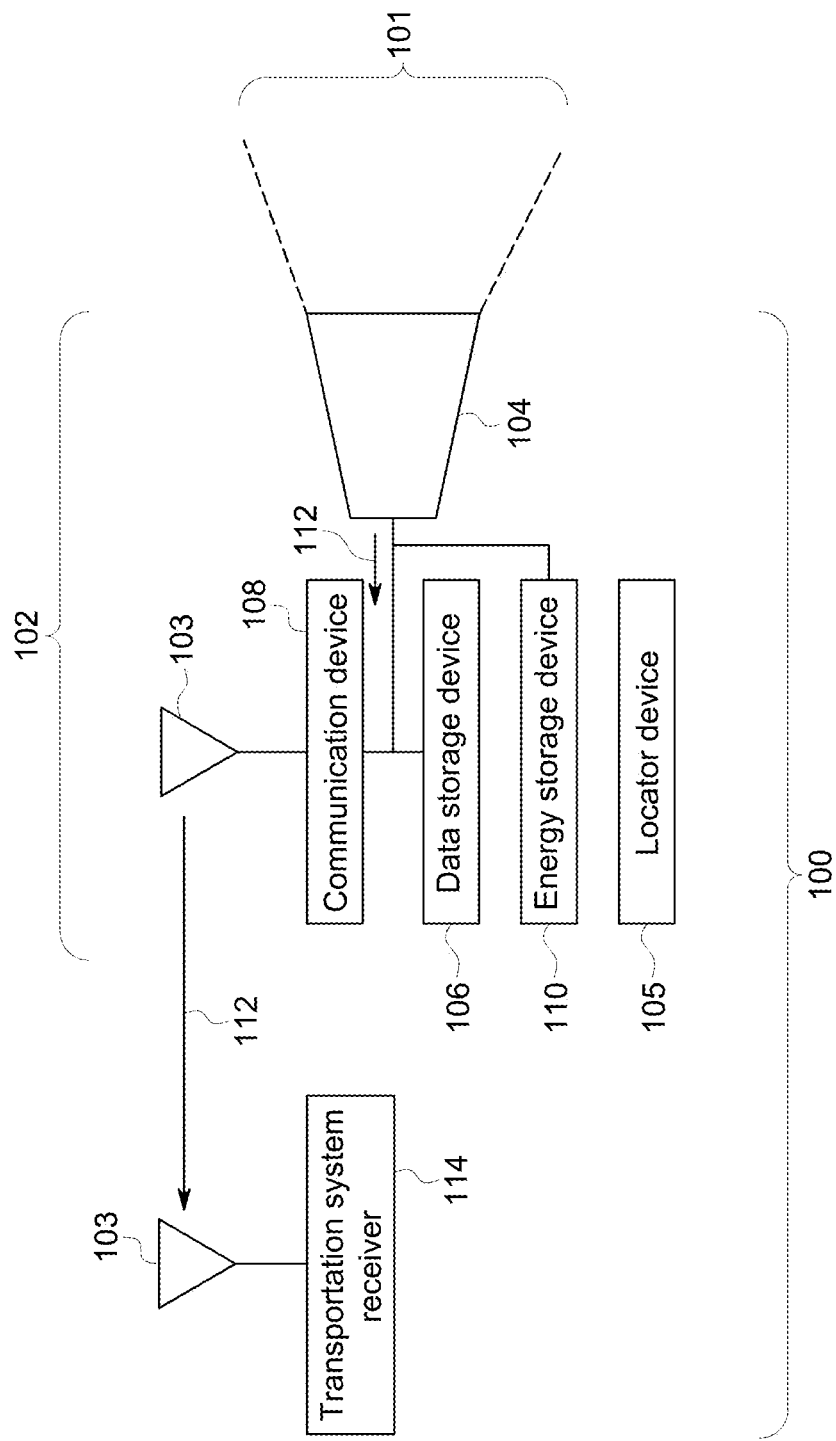
FIG. 1 illustrates a camera system for capturing and communicating transportation data related to vehicles or otherwise to a transportation system according to one embodiment.

Embodiments described herein relate to video units for capturing and communicating video data in a transportation system or network. For example, the camera may be connected or otherwise disposed onboard an aerial device (e.g., a drone, helicopter, or airplane) to allow the camera unit to fly The aerial device can fly above the route ahead of a non-aerial vehicle and communicate image data back to the non-aerial vehicle. The non-aerial vehicle includes a vehicle that is restricted to propelling itself along non-airborne routes, such as rail vehicles, other off-highway vehicles (e.g., mining vehicles or other ground-based vehicles that are not designed and/or not legally permitted to travel on public roadways), marine vessels, automobiles, or the like. This image data can include still images (e.g., snapshots), videos (e.g., data that shows movement), or a combination thereof. The image data can provide an operator of the non-aerial vehicle a view of the route well in advance of the arrival of the non-aerial vehicle. For very high speed non-aerial vehicles, the stopping distance may be beyond the visibility provided from the vantage of the non-aerial vehicle. The view from the aerial device, then, may extend or supplement that visible range. In addition, the camera itself may be repositionable and may have the ability to pan left, right, up and down, as well as the ability to zoom in and out.

Other embodiments relate to antennas (e.g., microstrip antennas), which for example may be deployed on board aerial vehicles for wirelessly communicating image data to another vehicle or other offboard location. According to an aspect, the antenna may be compact (low profile and light), and may have a high passive gain and a high bandwidth.

As used herein, a camera is a device for capturing and/or recording visual images. These images may be in the form of still shots, analog video signals, or digital video signals. The signals, particularly the digital video signals, may be subject to compression/decompression algorithms, such as MPEG or HEVC, for example. A suitable camera may capture and record in a determined band of wavelengths of light or energy. For example, in one embodiment the camera may sense wavelengths in the visible spectrum and in another the camera may sense wavelengths in the infrared spectrum. Multiple sensors may be combined in a single camera and may be used selectively based on the application. Further, stereoscopic and 3D cameras are contemplated for at least some embodiments described herein. These cameras may assist in determining distance, velocity, and vectors to predict (and thereby avoid) collision and damage. The term consist, or vehicle consist, refers to two or more vehicles or items of mobile equipment that are mechanically or logically coupled to each other. By logically coupled, the plural items of mobile equipment are controlled so that controls to move one of the items causes a corresponding movement in the other items in consist, such as by wireless command. An Ethernet over multiple unit (eMU) system may include, for example, a communication system for use transmitting data from one vehicle to another in consist (e.g., an Ethernet network over which data is communicated between two or more vehicles).

FIG. 1 illustrates a camera system 100 for capturing and communicating transportation data related to vehicles or otherwise to a transportation system according to one embodiment. The system includes a portable camera unit 102 having a camera 104, a data storage device 106 and/or a communication device 108, and a battery or other energy storage device 110. The camera unit may be portable in that the camera unit is small and/or light enough to be carried by a single adult human. The camera unit is configured to capture and/or generate image data 112 of a field of view 101 of the camera unit. For example, the field of view may represent the solid angle through which the camera unit is sensitive to light, electromagnetic radiation, or other energy that is used to form images, videos, or the like. The image data can include still images, videos (e.g., moving images or a series of images representative of a moving object), or the like, of one or more objects within the field of view of the camera unit. In any of the embodiments of any of the camera systems described herein, data other than image data may be captured and communicated, e.g., the portable camera unit may have a microphone for capturing audio data, a vibration sensor for capturing vibration data, and so on.

A suitable portable camera unit may be an Internet protocol camera unit, such as a camera that can send video data via the Internet or another network. In one aspect, the camera can be a digital camera capable of obtaining relatively high quality image data (e.g., static or still images and/or videos). For example, the camera may be Internet protocol (IP) cameras that generate packetized image data. The camera can be a high definition (HD) camera capable of obtaining image data at relatively high resolutions. For example, the camera may obtain image data having at least 480 horizontal scan lines, at least 576 horizontal scan lines, at least 720 horizontal scan lines, at least 1080 horizontal scan lines, or an even greater resolution. Alternatively, the camera may be another type of camera.

The data storage device may be electrically connected to the camera unit and configured to store the image data. The data storage device may include one or more computer hard disk drives, removable drives, magnetic drives, read only memories, random access memories, flash drives or other solid state storage devices, or the like. Optionally, the data storage device may be disposed remote from the camera unit, such as by being separated from the camera unit by at least several centimeters, meters, kilometers, as determined at least in part by the application at hand.

The communication device may be electrically connected to the camera unit and configured to wirelessly communicate (e.g., transmit, broadcast, or the like) the image data to a transportation system receiver 114 located off-board the camera unit. Optionally, the image data may be communicated to the receiver via one or more wired connections, over power lines, through other data storage devices, or the like. The communication device and/or receiver can represent hardware circuits or circuitry, such as transceiving circuitry and associated hardware (e.g., antennas) 103, that include and/or are connected with one or more processors (e.g., microprocessors, controllers, or the like).

The energy storage device may be electrically connected to the camera unit, the data storage device, and/or the communication device. The energy storage device can represent one or more devices that store and/or generate electric current to power the camera unit, the data storage device, and/or the communication device. For example, the energy storage device can include one or more batteries, pantographs (e.g., that receive current from an off-board source via a catenary or overhead line), conductive shoes (e.g., that contact a conductive body, such as an electrified rail, to receive current from an off-board source), generators, alternators, or the like.

In one embodiment, the camera unit comprises the camera, the data storage device, and the energy storage device, but not the communication device. In such an embodiment, the camera unit may be used for storing captured image data for later retrieval and use. In another embodiment, the camera unit comprises the camera, the communication device, and the energy storage device, but not the data storage device. In such an embodiment, the portable camera unit may be used to communicate the image data to a vehicle or other location for immediate use (e.g., being displayed on a display screen), and/or for storage remote from the portable camera unit (this is, for storage not within the portable camera unit). In another embodiment, the camera unit comprises the camera, the communication device, the data storage device, and the energy storage device. In such an embodiment, the portable camera unit may have multiple modes of operation, such as a first mode of operation where image data is stored within the portable camera unit on the data storage device 106, and a second mode of operation where the image data is transmitted off the portable camera unit for remote storage and/or immediate use elsewhere.

The camera may be a digital video camera, such as a camera having a lens, an electronic sensor for converting light that passes through the lens into electronic signals, and a controller for converting the electronic signals output by the electronic sensor into the image data, which may be formatted according to a standard such as MP4. The data storage device, if present, may be a hard disc drive, flash memory (electronic non-volatile non-transitory computer storage medium), or the like. The communication device, if present, may be a wireless local area network (LAN) transmitter (e.g., Wi-Fi transmitter), a radio frequency (RF) transmitter that transmits in and according to one or more commercial cell frequencies/protocols (e.g., 3G or 4G), and/or an RF transmitter that is configured to wirelessly communicate at frequencies used for vehicle communications (e.g., at a frequency compatible with a wireless receiver of a distributed power system of a rail vehicle; distributed power refers to coordinated traction control, such as throttle and braking, of a train or other rail vehicle consist having plural locomotives or other powered rail vehicle units). A suitable energy storage device may be a rechargeable lithium-ion battery, a rechargeable Ni-Mh battery, an alkaline cell, or other device configured for portable energy storage for use in an electronic device. Another suitable energy storage device, albeit more of an energy provider than storage, include a piezoelectric vibration harvester and a solar panel, where energy is generated and then provided to the camera system.

The camera unit can include a locator device 105 that generates data used to determine the location of the camera unit. The locator device 105 can represent one or more hardware circuits or circuitry that include and/or are connected with one or more processors (e.g., controllers, microprocessors, or other electronic logic-based devices). In one example, the locator device 105 represents a global positioning system (GPS) receiver that determines a location of the camera unit, a beacon or other communication device that broadcasts or transmits a signal that is received by another component (e.g., the transportation system receiver) to determine how far the camera unit is from the component that receives the signal (e.g., the receiver), a radio frequency identification (RFID) tag or reader that emits and/or receives electromagnetic radiation to determine how far the camera unit is from another RFID reader or tag (e.g., the receiver), or the like. The receiver can receive signals from the locator device 105 to determine the location of the locator device 105 relative to the receiver and/or another location (e.g., relative to a vehicle or vehicle system). Additionally or alternatively, the locator device 105 can receive signals from the receiver (e.g., which may include a transceiver capable of transmitting and/or broadcasting signals) to determine the location of the locator device 105 relative to the receiver and/or another location (e.g., relative to a vehicle or vehicle system).

The image data may be autonomously examined by one or more image data analysis systems or image analysis systems described herein. For example, one or more of the transportation receiver system 114, a vehicle, and/or the camera unit may include an image data analysis system (also referred to as an image analysis system) that examines the image data for one or more purposes described herein.

Figure 2:
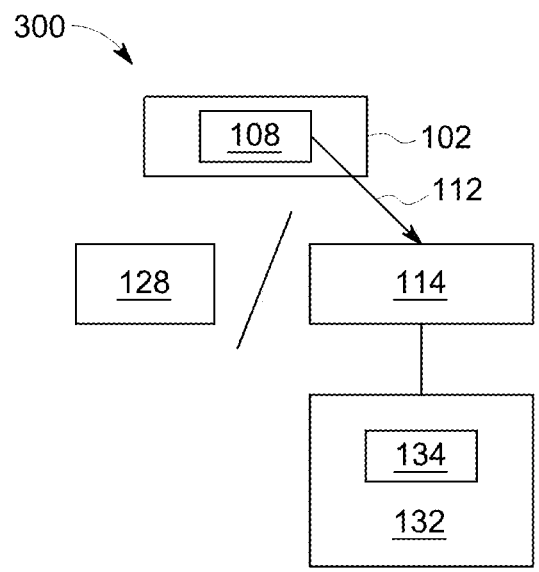
FIG. 2 illustrates another embodiment of a camera system.

FIG. 2 illustrates another embodiment of a camera system 300. The system can include a display screen system 132 located remote from the portable camera unit and/or the non-aerial vehicle. Optionally, the display screen system 132 is at least partially disposed onboard the non-aerial vehicle. The display screen system receives the image data from the transportation system receiver as a live feed and display the image data (e.g., converted back into moving images) on a display screen 134 of the display screen system. The live feed can include image data representative of objects contemporaneous with capturing the video data but for communication lags associated with communicating the image data from the portable camera unit to the display screen system. Such an embodiment may be used, for example, for communicating image data, captured by the portable camera unit disposed onboard an aerial device flying ahead of the non-aerial vehicle to a remote human operator viewing the display screen. The remote human operator, for example, may be onboard the non-aerial vehicle that is moving behind the aerial device, an expert in the particular task or tasks, or another person, that can examine the image data and/or provide advice or instructions to the on-scene human operator based on the image data.

In another embodiment, the system has the display screen disposed onboard the non-aerial vehicle, such as in an operator cab of the non-aerial vehicle. The communication device of the portable camera unit can wirelessly transmit the image data to the transportation system receiver which may be located onboard the non-aerial vehicle and operably connected to the display screen, for the image data to be displayed on the display screen. Such an embodiment may be used for one operator of the non-aerial vehicle to view the image data captured by an aerial device flying ahead of the non-aerial vehicle.

Figure 3:
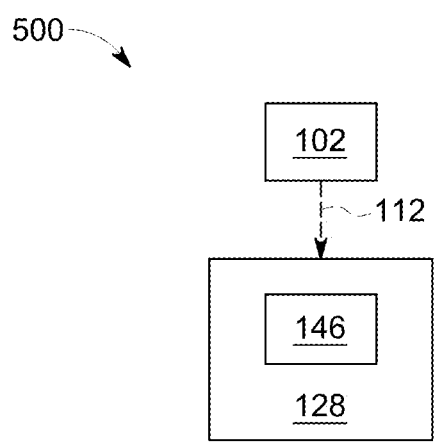
FIG. 3 illustrates another embodiment of a camera system.

FIG. 3 illustrates another embodiment of a camera system 500. A control system 146 onboard the vehicle may be provided for controlling movement of the non-aerial vehicle. The control system can include or represent the control unit, and can include hardware circuits or circuitry that include and/or are connected with one or more processors (e.g., microprocessors, controllers, or the like). The control system can control operations of the non-aerial vehicle, such as by communicating command signals to a propulsion system of the vehicle (e.g., motors, engines, brakes, or the like) for controlling output of the propulsion system.

The control system can prevent movement of the non-aerial vehicle responsive to a first data content of the image data and allow movement of the non-aerial vehicle responsive to a different, second data content of the image data. For example, the control system onboard the non-aerial vehicle may engage brakes and/or prevent motors from moving the non-aerial vehicle to prevent movement of the non-aerial vehicle responsive to the first data content of the image data indicating the image data from the portable camera unit (e.g., onboard an aerial device flying ahead of the non-aerial vehicle) indicating that one or more segments of the route ahead of the non-aerial vehicle along a direction of travel are damaged, obstructed by one or more obstacles, occupied by one or more other vehicles, or otherwise unsafe to travel over.

Figure 4:
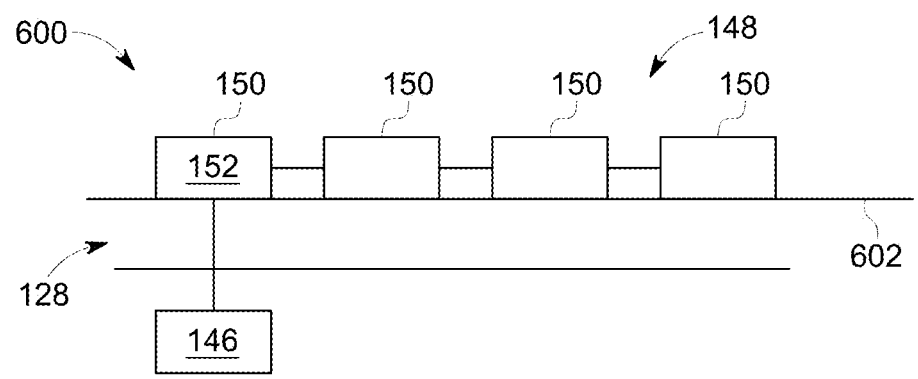
FIG. 4 illustrates one embodiment of a non-aerial vehicle.

FIG. 4 illustrates one embodiment of the non-aerial vehicle. The non-aerial vehicle can include one or more vehicle consists 148 having plural interconnected non-aerial vehicle units 150, with at least one of the plural vehicle units being a propulsion-generating, non-aerial vehicle unit 152. The non-aerial vehicle can represent a rail vehicle system, such as a train, with the vehicle units 150, 152 representing locomotives, rail cars, or other types of rail vehicles. For example, the vehicle unit 150 can represent a propulsion-generating vehicle unit, while the vehicle units 152 represent non-propulsion-generating vehicle units, such as rail cars. Alternatively, the non-aerial vehicle can represent another type of vehicle, such as an automobile, marine vessel, mining vehicle, other off-highway vehicle (e.g., a vehicle that is not designed for and/or legally permitted to travel on public roadways), or the like. The consist can represent plural vehicle units mechanically connected to travel together along a land or water route 602, such as a track, road, waterway, or the like. Alternatively, the consist and/or vehicle can include plural vehicle units that communicate with each other to travel together along the route 602, but that are not connected with each other. For example, the vehicle unit may send command signals to the vehicle units to instruct the vehicle units how to move along the route 602 to maintain separation distances between the vehicle units.

The control system onboard the vehicle can be configured to prevent movement of the vehicle consist responsive to the first data content of the image data indicating that one or more segments of the route ahead of the vehicle are damaged or otherwise unsafe for continued travel. For example, responsive to the image data indicating that an upcoming segment of the route is being worked on, is occupied by another vehicle, is impassible due to an obstacle on the route (e.g., an automobile stuck on the track at a crossing), is damaged (e.g., has a broken rail), has a broken switch, or the like, the control system may implement one or more remedial actions. These actions can include, but are not limited to, generating a warning (e.g., visual, audible, or a combination thereof) to an operator of the non-aerial vehicle, automatically slowing or stopping movement of the non-aerial vehicle, communicating a request to an off-board location (e.g., dispatch center, maintenance facility, etc.) for repair, maintenance, and/or inspection of the upcoming segment of the route, change a scheduled trip or route of the vehicle to avoid the upcoming segment, or the like.

Figure 5:
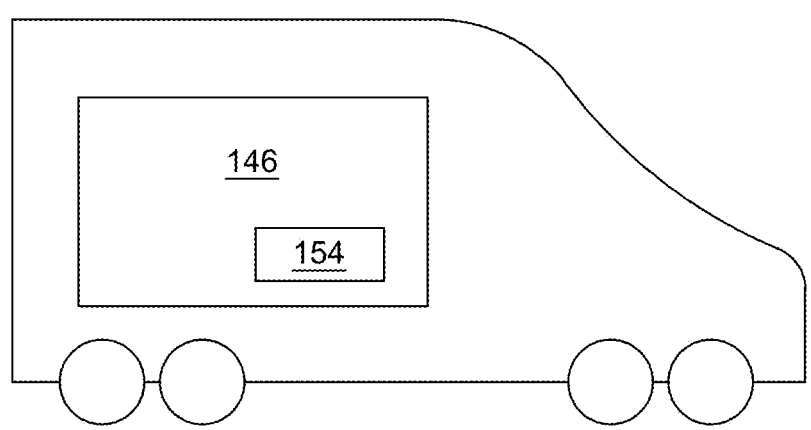
FIG. 5 illustrates a control system according to one embodiment.

FIG. 5 illustrates the control system according to one embodiment. The control system can be disposed onboard the non-aerial vehicle and also can include an image data analysis system 154. The analysis system can automatically process the image data for identifying data content in the image data. The control system can be configured to automatically prevent and allow movement of the vehicle responsive to the first data and the second data, respectively, that is identified by the image data analysis system. The image data analysis system can include one or more image analysis processors that autonomously examine the image data obtained by the camera unit for one or more purposes, as described herein.

Figure 6:
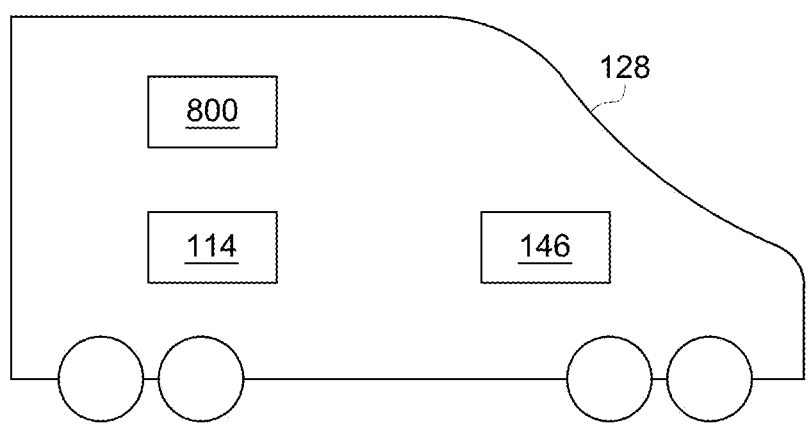
FIG. 6 illustrates a transportation system receiver located onboard the non-aerial vehicle according to one embodiment.

FIG. 6 illustrates the transportation system receiver located onboard the non-aerial vehicle according to one embodiment. The transportation system receiver can be configured to wirelessly communicate network data onboard and/or off-board the non-aerial vehicle, and/or to automatically switch to a mode for receiving the image data from the portable camera unit responsive to the portable camera unit being active to communicate the image data. For example, responsive to the portable camera unit being active to transmit the image data, the transportation system receiver may be configured to automatically switch from a network wireless client mode of operation (transmitting data originating from a device onboard the vehicle, such as the control unit) to the mode for receiving the image data from the portable camera unit. The mode for receiving the image data from the portable camera unit may comprise a wireless access point mode of operation (receiving data from the portable camera unit).

In another embodiment, the camera system further comprises the transportation system receiver located onboard the non-aerial vehicle. The transportation system receiver can be configured to wirelessly communicate network data onboard and/or off-board the vehicle, and/or to automatically switch from a network wireless client mode of operation to a wireless access point mode of operation, for receiving the image data from the portable camera unit. This network data can include data other than image data. For example, the network data can include information about an upcoming trip of the vehicle (e.g., a schedule, grades of a route, curvature of a route, speed limits, areas under maintenance or repair, etc.), cargo being carried by the vehicle, or other information. Alternatively, the network data can include the image data.

In another embodiment of one or more of the camera systems described herein, the system is configured for the image data to be stored and/or used locally (e.g., in the vehicle), or to be transmitted to a remote location (e.g., off-vehicle location) based on where the vehicle is located. For example, if the vehicle is in a yard (e.g., a switching yard, maintenance facility, or the like), the image data may be transmitted to a location in the yard. But, prior to the vehicle entering the yard or a designated location in the yard, the image data may be stored onboard the vehicle and not communicated to any location off of the vehicle.

Thus, in an embodiment, the system further comprises a control unit that, responsive to at least one of a location of the portable camera unit or a control input, controls at least one of the portable camera unit or the transportation system receiver to a first mode of operation for at least one of storing or displaying the video data on board the rail vehicle and to a second mode of operation for communicating the video data off board the rail vehicle for at least one of storage or display of the video data off board the rail vehicle. For example, the control unit may be configured to automatically control at least one of the portable camera unit or the transportation system receiver from the first mode of operation to the second mode of operation responsive to the location of the portable camera unit being indicative of the rail vehicle being in a yard.

During operation of the vehicle and/or camera unit outside of a designated area (e.g., a geofence extending around a vehicle yard or other location), the image data generated by the camera may be locally stored in the data storage device of the camera unit, shown on a display of the vehicle, or the like. Responsive to the vehicle and/or camera unit entering into the designated area, the camera unit can switch modes to begin wirelessly communicating the image data to the receiver, which may be located in the designated area. Changing where the image data is communicated based on the location of the vehicle and/or camera unit can allow for the image data to be accessible to those operators viewing the image data for safety, analysis, or the like. For example, during movement of the vehicle outside of the vehicle yard, the image data can be presented to an onboard operator, and/or the image data may be analyzed by an onboard analysis system of the vehicle to ensure safe operation of the vehicle. Responsive to the vehicle and/or camera unit entering into the vehicle yard, the image data can be communicated to a central office or management facility for remote monitoring of the vehicle and/or operations being performed near the vehicle.

As one example, event data transmission (e.g., the transmitting, broadcasting, or other communication of image data) may be configured to occur based on various vehicle conditions, geographic locations, and/or situations. The image data may be either pulled (e.g., requested) or pushed (e.g., transmitted and/or broadcast) from the vehicle. For example, image data can be sent from a vehicle to an off-board location based on selected operating conditions (e.g., emergency brake application), a geographic location (e.g., in the vicinity of a crossing between two or more routes), selected and/or derived operating areas of concern (e.g., high wheel slip or vehicle speed exceeding area limits), and/or time driven messages (e.g., sent once a day). The off-board location may also request and retrieve the image data from specific vehicles on demand.

Figure 7:
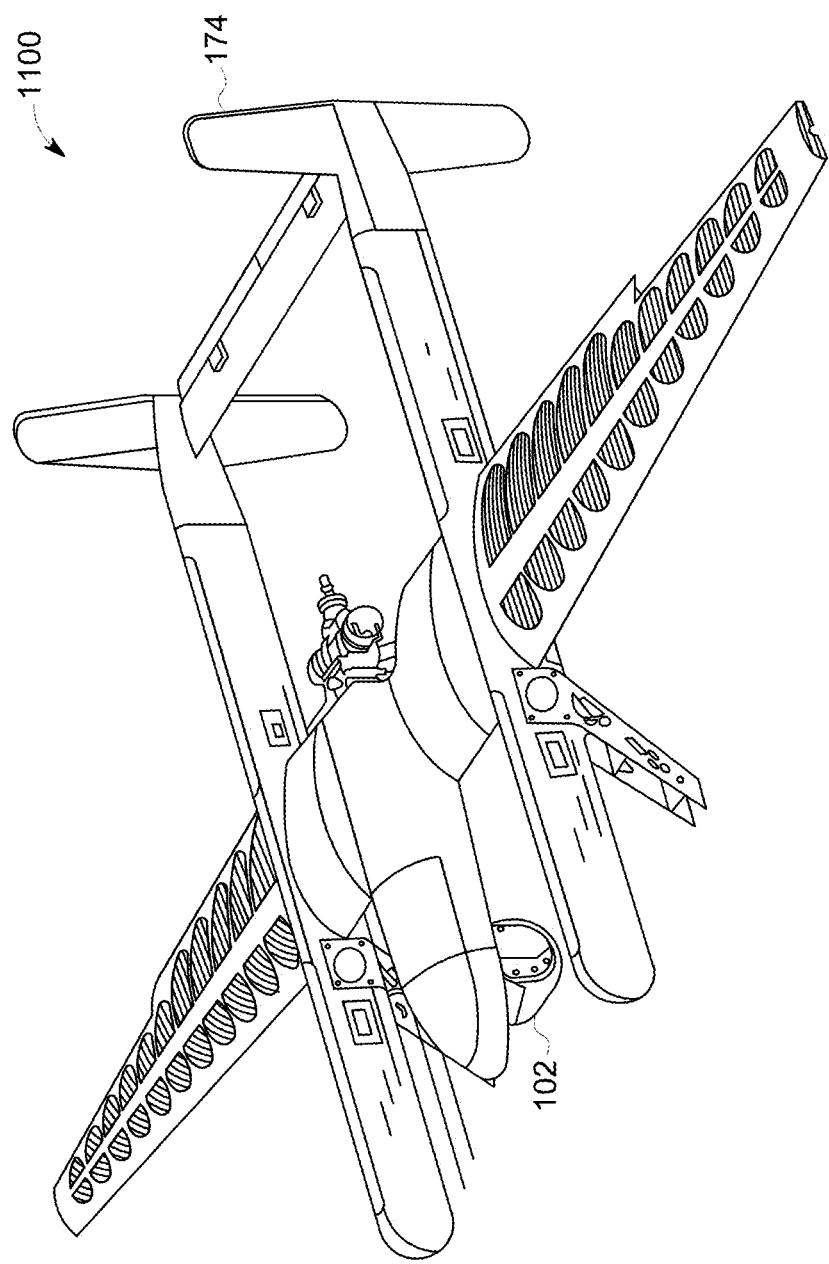
FIG. 7 illustrates a perspective view of a camera system.
Figure 8:
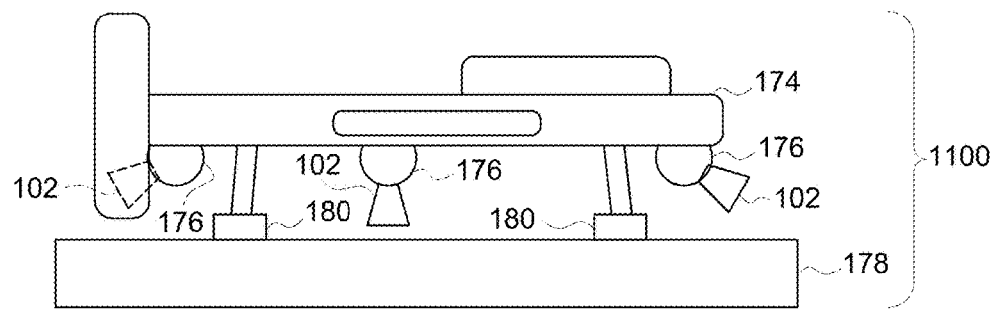
FIG. 8 illustrates a side view of the camera system shown in FIG. 7.
Figure 9:
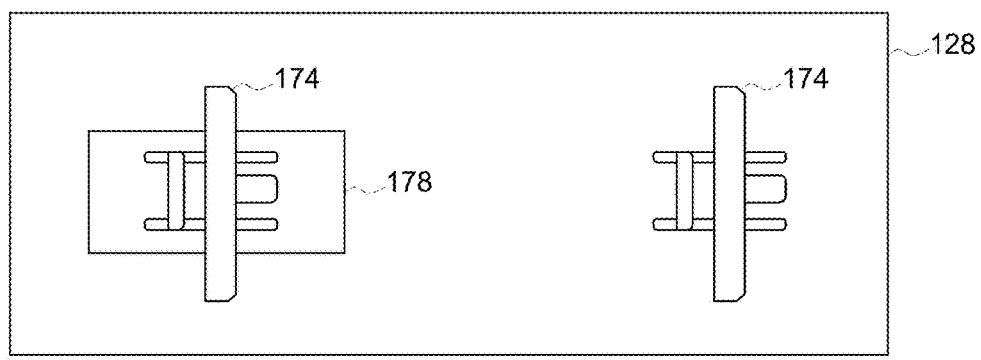
FIG. 9 illustrates a top view of the camera system shown in FIG. 7.

FIGS. 7, 8, and 9 illustrate another embodiment of a camera system 1100. FIG. 7 illustrates a perspective view of the camera system, FIG. 8 illustrates a side view of the camera system, and FIG. 9 illustrates a top view of the camera system 1100. The system includes an aerial device 174 configured for at least one of remote control or autonomous flying over a ground route of the non-aerial vehicle. The aerial device may have one or more camera docks 176 for receiving one or more portable camera units, and may have also a vehicle dock for coupling the aerial device to the non-aerial vehicle. In the illustrated example, the aerial device includes three cameras, with one camera unit facing along a forward direction of travel of the aerial device, another camera unit facing along a downward direction toward the ground or route over which the aerial device flies, and another camera unit facing along a rearward direction of the aerial device. Alternatively, a different number of camera units may be used and/or the camera units may be oriented in other directions.

When the aerial device is in the air, the portable camera units can be positioned for the cameras to view the route, the vehicle, or other areas near the vehicle. The aerial device may be, for example, a scale dirigible, a scale helicopter, or the like (e.g., the aerial device may be smaller than needed for transporting humans, such as 1/10 scale or smaller). A suitable scale helicopter can include quadcopters and the like.

The system also can include an aerial device vehicle dock 178 to attach the aerial device to the vehicle. The aerial device vehicle dock can receive the aerial device for at least one of detachable coupling of the aerial device to the vehicle, charging of a battery of the aerial device from a power source of the non-aerial vehicle, or the like. For example, the dock can include one or more connectors 180 that mechanically or magnetically coupled with the aerial device to prevent the aerial device from moving relative to the dock, that conductively couple an onboard power source (e.g., battery) of the aerial device with a power source of the vehicle (e.g., generator, alternator, battery, pantograph, or the like) so that the power source of the aerial device can be charged by the power source of the non-aerial vehicle during movement of the vehicle.

The aerial device can fly off of the vehicle to obtain image data that is communicated from one or more of the cameras onboard the aerial device to one or more receivers 114 onboard the vehicle. The aerial device can fly relative to the vehicle while the vehicle is stationary and/or while the vehicle is moving along a route. The image data may be displayed to an operator on a display device onboard the vehicle and/or may be autonomously examined as described herein. The image data can be examined by the operator and/or an image analysis system of the vehicle, such as to examine the vehicle, to examine other vehicles traveling relative to the vehicle (e.g., to avoid collisions between the vehicles), to examine the route being traveled upon (e.g., to perform route inspection), to warn of upcoming obstructions or other problems along the route ahead of the vehicle, and the like. When the aerial device is coupled into the vehicle dock, one or more cameras can be positioned to view the route during movement of the vehicle.

In one aspect, the image data obtained by the aerial device can be automatically examined by the image analysis system onboard the non-aerial vehicle to detect hazards such as an impending collision with obstacles onboard the route ahead of the non-aerial vehicle, potential derailment due to breaks or other types of damage to the rail, or the like.

In one mode of operation, the system includes three or more aerial devices, such two or more of the aerial devices docked onboard the non-aerial vehicle. A control unit onboard the non-aerial vehicle (e.g., the control unit 146 or a control unit that is separate from the control unit 146) can remotely control flight of at least one of the aerial devices.

Figure 10:
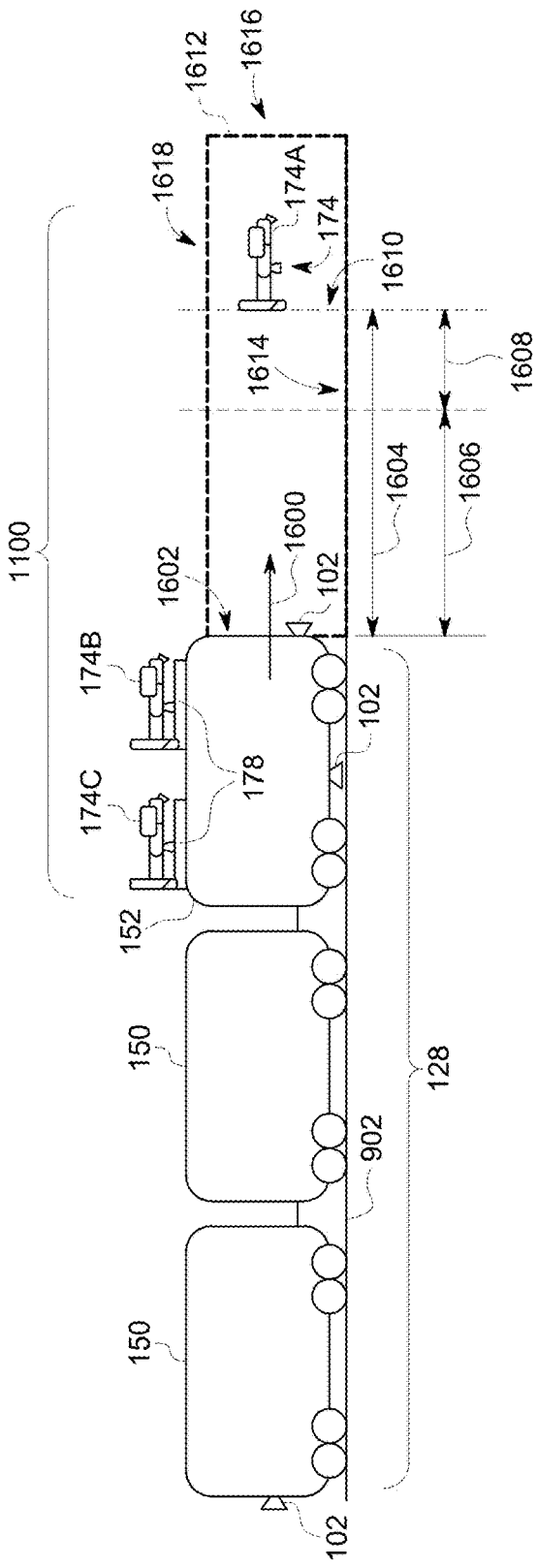
FIG. 10 illustrates operation of the camera system shown in FIGS. 7, 8, and 9 according to one embodiment.

FIG. 10 illustrates operation of the camera system 1100 shown in FIGS. 7, 8, and 9 according to one embodiment. The camera system can include several aerial devices 174, such as three aerial devices 174 (e.g., aerial devices 174A-C) or another number of aerial devices. In one aspect, a first aerial device 174A can fly off of the vehicle 128 (such as ahead of the vehicle 128), and second and/or third aerial devices 174B, 174C can be on one or more docks 178 of the vehicle (such that the second and third aerial devices 174B, 174C are moving with, but not relative to, the vehicle). Optionally, the aerial devices may land and remain on the vehicle without use of the docks 178. While the aerial devices and docks are shown on the same vehicle unit 150 of the vehicle, optionally, one or more of the aerial devices and/or docks may be disposed on another vehicle unit 150 and/or 152 of the vehicle. Additionally, while the aerial devices and docks are shown onboard the leading vehicle unit of the vehicle (along a direction of travel 1600 of the vehicle), one or more (or all) of the aerial devices that are onboard the vehicle 128 may be disposed onboard one or more other vehicle units.

The aerial devices can switch off duties or operations between the aerial devices to ensure that at least one aerial device is generating image data 112, another aerial device 174 is being charged with current from the vehicle, and/or another aerial device can be stationary on the vehicle and ready to begin flying relative to the vehicle. For example, in order to ensure continual generation of the image data 112 representative of areas ahead of the vehicle by at least one aerial device 174A, the first aerial device 174A may fly ahead of the vehicle to obtain image data of the route for sending back to the vehicle for examination. Prior to the first aerial device returning to a dock of the vehicle (e.g., to recharge batteries of the first aerial device), the second aerial device 174B can fly off the vehicle to a location at or near the first aerial device and begin generating the image data 112. The first aerial device can return to a dock of the vehicle to charge batteries of the first aerial device. In one aspect, the first aerial device may return to the vehicle only after the second aerial device is flying ahead of the vehicle in a location that allows the second aerial device to obtain image data of areas ahead of the first aerial device. At a later time, the third aerial device 174C can fly to the location of the second aerial device and begin generating the image data so that the second aerial device can return to a dock to charge batteries of the second aerial device. At a later time, the first aerial device can fly ahead of the vehicle to replace operation of the third aerial device. In doing so, the aerial devices can ensure that at least one aerial device is obtaining image data, another aerial device is charged with energy and ready to fly off the vehicle, and another aerial device is charging at all times.

In FIG. 10, the vehicle is shown as a rail vehicle, but alternatively may be another type of vehicle. The vehicle moves along the route in the direction of travel 1600. The vehicle can include one or more onboard camera units 102 to generate image data of portions of the route 902 located beneath the vehicle, portions of the route ahead and/or behind the vehicle, or other areas around the vehicle. This image data can be displayed onboard the vehicle to an operator and/or examined by an image analysis system to identify damaged sections of the route.

At least one of the aerial devices can fly ahead of the vehicle along the direction of travel to generate image data representative of areas ahead of the vehicle along the direction of travel. This image data can represent portions of the route ahead of the aerial device, portions of the route beneath the aerial device, and/or portions of the route behind the aerial device (e.g., between the aerial device and the vehicle). Alternatively, the image data can represent other areas. The image data obtained by the camera unit(s) onboard the vehicle and by the camera unit(s) onboard the aerial device can be examined to detect obstacles on the route, problems with the route, or other hazards, as described herein. In one embodiment, the aerial device can communicate the image data to an image analysis system onboard the vehicle, which also examines the image data for obstacles, problems, or hazards.

In one aspect, the locations where the aerial device is permitted to fly relative to the vehicle may be limited. For example, the aerial device may not fly closer to a leading end 1602 of the vehicle (e.g., along the direction of travel) than a designated leading distance 1604 along the route. The leading distance may be measured along the path of the route and, in situations where the route is not linear, the leading distance may be measured along the non-linear path of the route. Alternatively, the leading distance may be a linear distance that does is not measured along the path of the non-linear route.

The leading distance can change based on changing operations of the vehicle. For example, the leading distance can be a combination (e.g., sum) of a safe braking distance 1606 and a response time distance 1608. The safe braking distance represents the distance along the path of the route that the vehicle would move before stopping in response to engagement of one or more brakes of the vehicle. For example, if the vehicle were to engage air brakes of the vehicle, the safe braking distance represents how far the vehicle would continue to move subsequent to engaging the brakes before stopping all movement. The response time distance represents the distance along the path of the route that the vehicle would travel before an operator onboard the vehicle could engage the brakes of the vehicle in response to identifying an event. For example, the response time distance represents how far the vehicle would move during a time period that begins with the operator seeing or being warned of an obstacle in the route or damage in the route ahead of the vehicle, the operator seeing the obstacle and/or damage, the operator receiving a warning of the obstacle and/or damage to the route, or the like. This time period ends when the operator actuates the brakes of the vehicle.

The control system disposed onboard the vehicle can calculate and/or change the leading distance, the safe braking distance, and/or the response time distance based on the operations of the vehicle and/or characteristics of the route. For example, the safe braking distance and/or the response time distance can change based on how fast the vehicle is moving, based on the path of the route, based on the grade of the route, based on adhesion between wheels of the vehicle and the route, based on an available braking effort, or the like. For example, the safe braking distance and/or the response time distance can be longer for faster speeds of the vehicle and shorter for slower speeds of the vehicle.

The safe braking distance and/or the response time distance can be longer for segments of the route having larger radii of curvature or straight segments of the route, and shorter for segments of the route having smaller radii of curvature. Route segments having smaller radii of curvature may resist movement of the vehicle more than route segments having larger radii of curvature and, as a result, the distance needed to stop the vehicle may be shorter on the segments having smaller radii of curvature.

The safe braking distance and/or the response time distance can be longer for segments of the route having flat and/or downhill grades and shorter for segments of the route having uphill grades. The additional acceleration of the vehicle caused by gravity on downhill grades can lengthen the distance needed to stop the vehicle. The deceleration of the vehicle caused by gravity on downhill grades and/or the absence of acceleration caused by gravity on flat grades can shorten the distance needed to stop movement of the vehicle.

The safe braking distance and/or the response time distance can be longer for smaller coefficients of friction between wheels of the vehicle and the route and shorter for segments of the route having larger coefficients of friction between wheels of the vehicle and the route. The distance needed to stop movement of the vehicle can increase when more wheel slip between the wheels and the route occurs, which can be a result of decreased coefficients of friction between the wheels and the route.

The safe braking distance and/or the response time distance can be longer for smaller available braking efforts of the vehicle (e.g., smaller air pressures in air brakes of the vehicle) and shorter for larger available braking efforts of the vehicle (e.g., larger air pressures in air brakes of the vehicle). For example, if the vehicle has reduced available braking efforts, such as during time periods when the air reservoirs or other components of an air brake system are recharging, the distance needed to stop the vehicle may increase relative to the vehicle having increased available braking effort.

The control system can calculate and update the leading distance, the safe braking distance, and/or the response time distance as the vehicle moves along the route and changes operations. For example, as the vehicle speeds up, travels along downhill grades, has increased wheel slip, or the like, the control system can increase the length of the leading distance, the safe braking distance, and/or the response time distance. The control system similarly can shorten the length of the leading distance, the safe braking distance, and/or the response time distance as the vehicle slows down, travels along uphill grades, has decreased wheel slip, or the like.

The updated leading distance, safe braking distance, and/or response time distance may be communicated to the aerial device, which can autonomously limit how far the aerial device flies ahead of the vehicle. Optionally, if the aerial device is being remotely controlled by an operator onboard the vehicle, the operator may limit how far the aerial device flies ahead of the vehicle based on the leading distance, safe braking distance, and/or response time distance. For example, the leading distance may be communicated to the operator and/or the control system may generate an audible and/or visual warning for the operator responsive to the aerial device approaching a far or distal end 1610 of the leading distance (e.g., coming within ten meters, fifty meters, 100 meters, or another threshold distance of the far end of the leading distance that opposes the leading end 1602 of the vehicle). The aerial device may approach the distal end of the leading distance when the aerial device slows relative to movement of the vehicle.

A movement envelope 1612 can be defined by sides or boundaries that limit where the aerial device may fly. One side or boundary of this movement envelope can be the leading edge of the vehicle. An opposite side or boundary of the movement envelope can be an outer leading edge or boundary 1616 represented by a vertically oriented plane that is parallel to the leading edge of the vehicle and separated from the leading edge of the vehicle by at least the leading distance. The leading edge or boundary can be farther from the leading end of the vehicle in order to provide room for the aerial device to move, as shown in FIG. 10. Alternatively, the leading edge or boundary may be separated from the leading end of the vehicle by the leading distance.

A bottom edge or boundary 1614 of the movement envelope can be the ground or water on which the vehicle is traveling. Alternatively, the bottom side or boundary can be elevated above and spaced apart from the ground or water, such as one or more meters above the route. An opposite upper side or boundary 1618 of the movement envelope can be separated from an upper surface of the route by a designated distance. The upper side or boundary can be defined to prevent the aerial device from flying too high above the route. For example, the vehicle may travel through tunnels, beneath other routes, beneath trees, beneath wires, or the like. The upper side or boundary may be defined to be no higher than the limits of the tunnels, other routes, trees, wires, or other obstacles such that, as long as the aerial device flies no higher than the upper side or boundary, the aerial device avoids contact with the obstacles.

Figure 11:
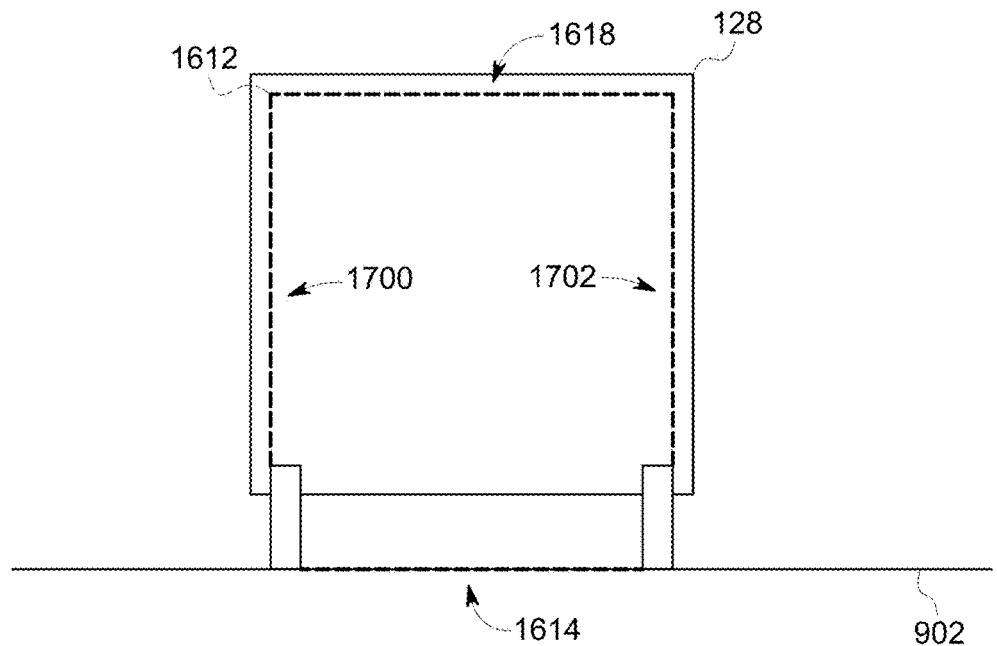
FIG. 11 illustrates a schematic diagram of a front view of a non-aerial vehicle and a movement envelope of an aerial device according to one embodiment.

FIG. 11 illustrates a schematic diagram of a front view of the vehicle 128 and the movement envelope 1612 of the aerial device 174 (shown in FIG. 7) according to one embodiment. As described above, the movement envelope may be defined by boundaries, such as upper and lower boundaries shown in FIG. 11. The movement envelope optionally may be defined by opposite lateral edges or boundaries 1700, 1702, as shown in FIG. 11. These lateral edges or boundaries may represent parallel, vertically oriented planes that are perpendicular to the leading edge or boundary of the movement envelope. Similar to the upper edge or boundary of the movement envelope, the lateral edges or boundaries may be defined based on upcoming obstacles above the route. For example, the lateral edges or boundaries may be closer together than opposite vertical sides of an upcoming tunnel, than the distance between trees, buildings, or other objects on opposite sides of the route, etc.

The aerial device may be prevented from flying outside of the movement envelope. For example, if autonomously controlled, the control unit of the vehicle and/or onboard the aerial device can prevent the aerial device from flying outside of the movement envelope. If manually controlled, the control unit can disregard or otherwise ignore commands entered by an operator that attempt to move the aerial device outside of the movement envelope.

Figure 12:
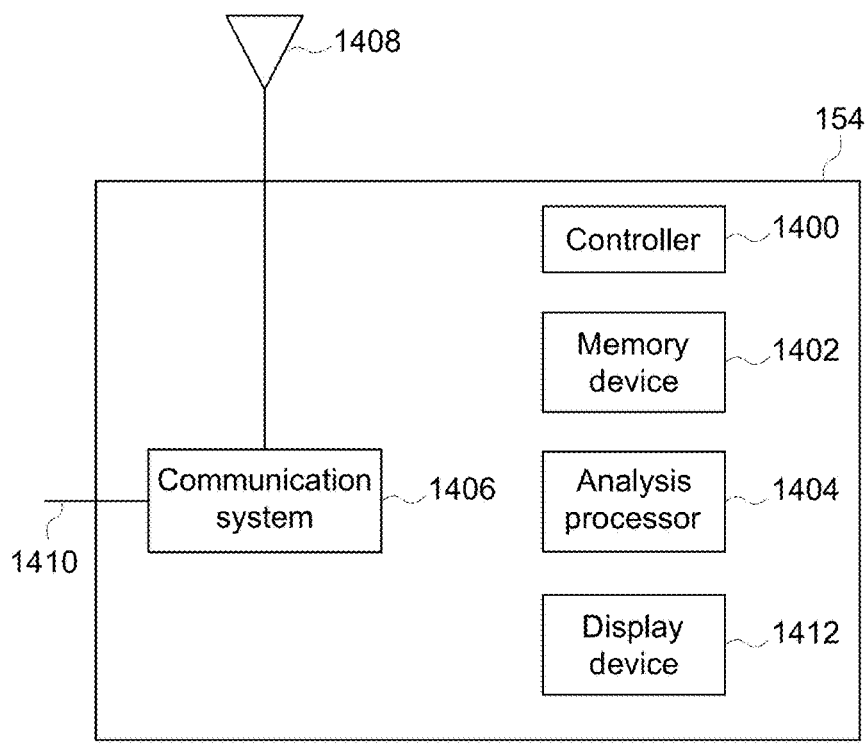
FIG. 12 is a schematic illustration of an image analysis system according to one embodiment.

FIG. 12 is a schematic illustration of the image analysis system 154 according to one embodiment. As described herein, the image analysis system can be used to examine the data content of the image data to automatically identify objects in the image data, damage in the route, or the like. A controller 1400 of the system includes or represents hardware circuits or circuitry that includes and/or is connected with one or more computer processors, such as one or more computer microprocessors. The controller can save image data obtained by the camera unit to one or more memory devices 1402 of the imaging system, generate alarm signals responsive to identifying one or more problems with the route and/or the wayside devices based on the image data that is obtained, or the like. The memory device 1402 includes one or more computer readable media used to at least temporarily store the image data. A suitable memory device can include a computer hard drive, flash or solid state drive, optical disk, or the like.

During travel of the vehicle along a route, the camera unit(s) onboard the vehicle and/or the aerial devices can generate image data representative of images and/or video of the field of view of the camera unit(s). For example, the image data may be used to inspect the health of the route, status of wayside devices along the route being traveled on by the vehicle, or the like. The field of view of the camera unit can encompass at least some of the route and/or wayside devices disposed ahead of the vehicle along a direction of travel of the vehicle. During movement of the vehicle along the route, the camera unit(s) can obtain image data representative of the route and/or the wayside devices for examination to determine if the route and/or wayside devices are functioning properly, or have been damaged, need repair, and/or need further examination.

The image data created by the camera unit can be referred to as machine vision, as the image data represents what is seen by the system in the field of view of the camera unit. One or more analysis processors 1404 of the system may examine the image data to identify conditions of the vehicle, the route, and/or wayside devices. Optionally, the analysis processor can examine the terrain at, near, or surrounding the route and/or wayside devices to determine if the terrain has changed such that maintenance of the route, wayside devices, and/or terrain is needed. For example, the analysis processor can examine the image data to determine if vegetation (e.g., trees, vines, bushes, and the like) is growing over the route or a wayside device (such as a signal) such that travel over the route may be impeded and/or view of the wayside device may be obscured from an operator of the vehicle. The analysis processor can represent hardware circuits and/or circuitry that include and/or are connected with one or more processors, such as one or more computer microprocessors, controllers, or the like.

As another example, the analysis processor can examine the image data to determine if the terrain has eroded away from, onto, or toward the route and/or wayside device such that the eroded terrain is interfering with travel over the route, is interfering with operations of the wayside device, or poses a risk of interfering with operation of the route and/or wayside device. Thus, the terrain "near" the route and/or wayside device may include the terrain that is within the field of view of the camera unit when the route and/or wayside device is within the field of view of the camera unit, the terrain that encroaches onto or is disposed beneath the route and/or wayside device, and/or the terrain that is within a designated distance from the route and/or wayside device (e.g., two meters, five meters, ten meters, or another distance).

Acquisition of image data from the camera unit can allow for the analysis processor 1404 to have access to sufficient information to examine individual video frames, individual still images, several video frames, or the like, and determine the condition of the route, the wayside devices, and/or terrain at or near the wayside device. The image data optionally can allow for the analysis processor to have access to sufficient information to examine individual video frames, individual still images, several video frames, or the like, and determine the condition of the route. The condition of the route can represent the health of the route, such as a state of damage to one or more rails of a track, the presence of foreign objects on the route, overgrowth of vegetation onto the route, and the like. As used herein, the term "damage" can include physical damage to the route (e.g., a break in the route, pitting of the route, or the like), movement of the route from a prior or designated location, growth of vegetation toward and/or onto the route, deterioration in the supporting material (e.g., ballast material) beneath the route, or the like. For example, the analysis processor may examine the image data to determine if one or more rails are bent, twisted, broken, or otherwise damaged. Optionally, the analysis processor can measure distances between the rails to determine if the spacing between the rails differs from a designated distance (e.g., a gauge or other measurement of the route). The analysis of the image data by the analysis processor can be performed using one or more image and/or video processing algorithms, such as edge detection, pixel metrics, comparisons to benchmark images, object detection, gradient determination, or the like.

A communication system 1406 of the system represents hardware circuits or circuitry that include and/or are connected with one or more processors (e.g., microprocessors, controllers, or the like) and communication devices (e.g., wireless antenna 1408 and/or wired connections 1410) that operate as transmitters and/or transceivers for communicating signals with one or more locations. For example the communication system may wirelessly communicate signals via the antenna and/or communicate the signals over the wired connection (e.g., a cable, bus, or wire such as a multiple unit cable, train line, or the like) to a facility and/or another vehicle system, or the like.

The image analysis system optionally may examine the image data obtained by the camera unit to identify features of interest and/or designated objects in the image data. By way of example, the features of interest can include gauge distances between two or more portions of the route. With respect to rail vehicles, the features of interest that are identified from the image data can include gauge distances between rails of the route. The designated objects can include wayside assets, such as safety equipment, signs, signals, switches, inspection equipment, or the like. The image data can be inspected automatically by the route examination systems to determine changes in the features of interest, designated objects that are missing, designated objects that are damaged or malfunctioning, and/or to determine locations of the designated objects. This automatic inspection may be performed without operator intervention. Alternatively, the automatic inspection may be performed with the aid and/or at the request of an operator.

The image analysis system can use analysis of the image data to detect damage to the route. For example, misalignment of track traveled by rail vehicles can be identified. Based on the detected misalignment, an operator of the vehicle can be alerted so that the operator can implement one or more responsive actions, such as by slowing down and/or stopping the vehicle. When the damaged section of the route is identified, one or more other responsive actions may be initiated. For example, a warning signal may be communicated (e.g., transmitted or broadcast) to one or more other vehicles to warn the other vehicles of the damage, a warning signal may be communicated to one or more wayside devices disposed at or near the route so that the wayside devices can communicate the warning signals to one or more other vehicles, a warning signal can be communicated to an off-board facility that can arrange for the repair and/or further examination of the damaged segment of the route, or the like.

In another embodiment, the image analysis system can examine the image data to identify text, signs, or the like, along the route. For example, information printed or displayed on signs, display devices, vehicles, or the like, indicating speed limits, locations, warnings, upcoming obstacles, identities of vehicles, or the like, may be autonomously read by the image analysis system. The image analysis system can identify information by the detection and reading of information on signs. In one aspect, the image analysis processor can detect information (e.g., text, images, or the like) based on intensities of pixels in the image data, based on wireframe model data generated based on the image data, or the like. The image analysis processor can identify the information and store the information in the memory device. The image analysis processor can examine the information, such as by using optical character recognition to identify the letters, numbers, symbols, or the like, that are included in the image data. This information may be used to autonomously and/or remotely control the vehicle, such as by communicating a warning signal to the control unit of a vehicle, which can slow the vehicle in response to reading a sign that indicates a speed limit that is slower than a current actual speed of the vehicle. As another example, this information may be used to identify the vehicle and/or cargo carried by the vehicle by reading the information printed or displayed on the vehicle.

In another example, the image analysis system can examine the image data to ensure that safety equipment on the route is functioning as intended or designed. For example, the image analysis processor, can analyze image data that shows crossing equipment. The image analysis processor can examine this data to determine if the crossing equipment is functioning to notify other vehicles at a crossing (e.g., an intersection between the route and another route, such as a road for automobiles) of the passage of the vehicle through the crossing.

In another example, the image analysis system can examine the image data to predict when repair or maintenance of one or more objects shown in the image data is needed. For example, a history of the image data can be inspected to determine if the object exhibits a pattern of degradation over time. Based on this pattern, a services team (e.g., a group of one or more personnel and/or equipment) can identify which portions of the object are trending toward a bad condition or already are in bad condition, and then may proactively perform repair and/or maintenance on those portions of the object. The image data from multiple different camera units acquired at different times of the same objects can be examined to determine changes in the condition of the object. The image data obtained at different times of the same object can be examined in order to filter out external factors or conditions, such as the impact of precipitation (e.g., rain, snow, ice, or the like) on the appearance of the object, from examination of the object. This can be performed by converting the image data into wireframe model data, for example.

In one aspect, the analysis processor of the image analysis system can examine and compare image data acquired by camera units of the aerial device and the vehicle to detect hazards ahead of the vehicle, such as obstacles in front of the vehicle along the route, detect damaged segments of the route, or the like. For example, the aerial device can include a forward-facing camera unit that generates image data representative of a field of view ahead of the aerial device along the direction of travel 1600 (shown in FIG. 10), a downward-facing camera unit that generates image data representative of a field of view beneath the aerial device, and a rearward-facing camera that generates image data representative of a field of view behind the aerial device (e.g., opposite to the direction of travel of the vehicle and/or between the aerial device and the vehicle). The vehicle optionally may include one or more camera units, such as forward-facing, downward-facing, and/or rearward-facing camera units that generate image data.

Figure 13:
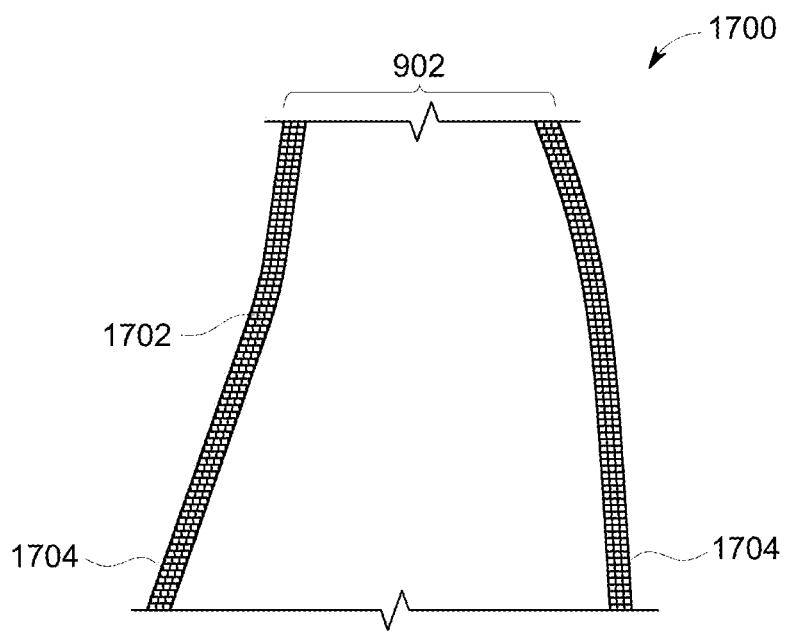
FIG. 13 illustrates one example of image data of a segment of a route.
Figure 14:
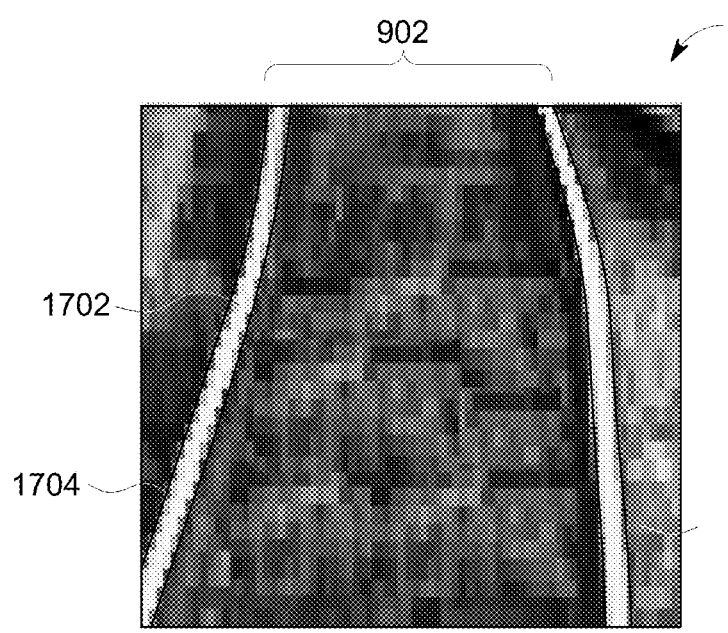
FIG. 14 illustrates another example of the image data shown in FIG. 13.

In one embodiment, the image data from the various camera units can be compared to benchmark visual profiles of the route by the image analysis processor to detect obstacles on the route, damage to the route (e.g., breaks and/or bending in rails of the route), or other hazards. FIGS. 13 and 14 illustrate one example of image data 1700 of a segment of the route 902. As shown in FIGS. 13 and 14, the image data may be a digital image formed from several pixels 1702 of varying color and/or intensity. Pixels with greater intensities may be lighter in color (e.g., more white) while pixels with lesser intensities may be darker in color. In one aspect, the image analysis processor examines the intensities of the pixels to determine which portions of the image data represent the route (e.g., rails 1704 of a track, edges of a road, or the like). For example, the processor may select those pixels having intensities that are greater than a designated threshold, the pixels having intensities that are greater than an average or median of several or all pixels in the image data, or other pixels as representing locations of the route. Alternatively, the processor may use another technique to identify the route in the image 200.

The image analysis processor can select one or more benchmark visual profiles from among several such profiles stored in a computer readable memory, such as the memory device 1402. The memory device 1402 can include or represent one or more memory devices, such as a computer hard drive, a CD-ROM, DVD ROM, a removable flash memory card, a magnetic tape, or the like. The memory device can store the image data obtained by the camera units and the benchmark visual profiles associated with a trip of the vehicle.

The benchmark visual profiles represent designated layouts of the route that the route is to have at different locations. For example, the benchmark visual profiles can represent the positions, arrangements, relative locations, of rails or opposite edges of the route when the rails or route were installed, repaired, last passed an inspection, or otherwise.

In one aspect, a benchmark visual profile is a designated gauge (e.g., distance between rails of a track, width of a road, or the like) of the route. Alternatively, a benchmark visual profile can be a previous image of the route at a selected location. In another example, a benchmark visual profile can be a definition of where the route is expected to be located in an image of the route. For example, different benchmark visual profiles can represent different shapes of the rails or edges of a road at different locations along a trip of the vehicle from one location to another.

The processor can determine which benchmark visual profile to select in the memory device based on a location of the vehicle when the image data is obtained by camera units disposed onboard the vehicle and/or a location of the aerial device when the image data is obtained by camera units disposed onboard the aerial device. The processor can select the benchmark visual profile from the memory device that is associated with and represents a designated layout or arrangement of the route at the location of the vehicle and/or aerial device when the image data is obtained. This designated layout or arrangement can represent the shape, spacing, arrangement, or the like, that the route is to have for safe travel of the vehicle. For example, the benchmark visual profile can represent the gauge and alignment of the rails of the track when the track was installed or last inspected.

Figure 15:
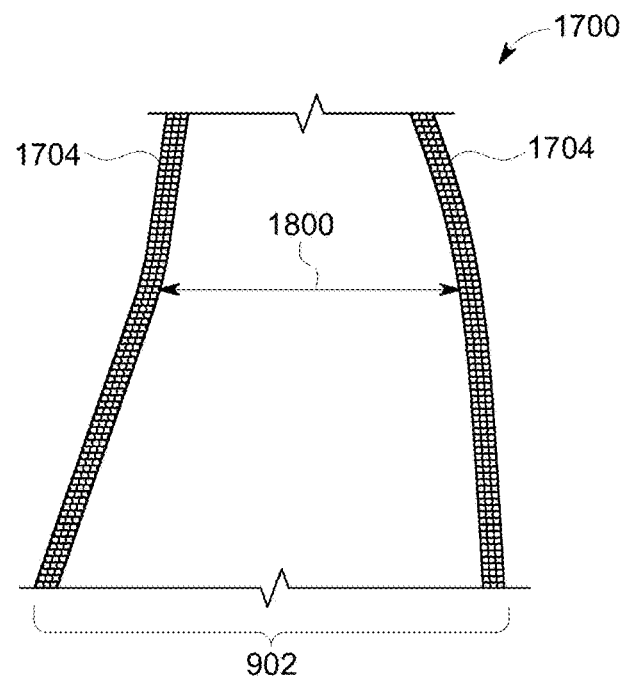
FIG. 15 illustrates another example of the image data of the route.
Figure 16:
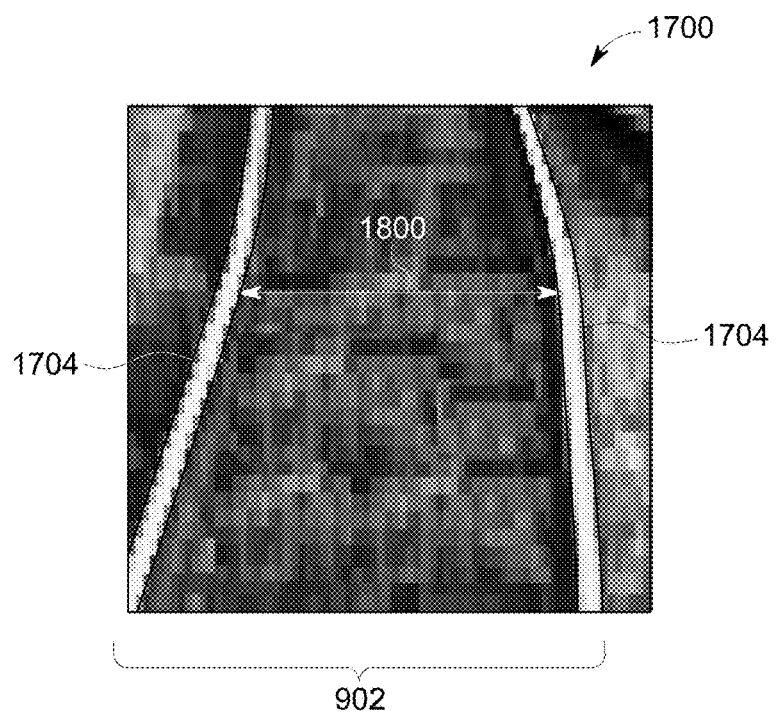
FIG. 16 illustrates another example of the image data of the route.

In one aspect, the image analysis processor can measure a gauge of the segment of the route shown in the image data to determine if the route is misaligned. FIGS. 15 and 16 illustrate another example of the image data of the route. The image analysis processor can examine the image data to measure a gauge distance 1800 between the rails of the route, between opposite sides or edges of the route, or the like. Optionally, the gauge distance can represent a geometric dimension of the route, such as a width of the route, a height of the route, a profile of the route, a radius of curvature of the route, or the like.

The image analysis processor can measure a straight line or linear distance between one or more pixels in the image data that are identified as representing one rail, side, edge, or other component of the route to one or more other pixels identified as representing another rail, side, edge, or other component of the route, as shown in FIGS. 15 and 16. This distance can represent a gauge distance of the route. Alternatively, the distance between other pixels may be measured. The image analysis processor can determine the gauge distance by multiplying the number of pixels between the rails, edges, sides, or other components of the route by a known distance that the width of each pixel represents in the image data, by converting the number of pixels in the gauge distance to length (e.g., in centimeters, meters, or the like) using a known conversion factor, by modifying a scale of the gauge distance shown in the image data by a scaling factor, or otherwise. In one aspect, the image analysis processor can convert the image data to or generate the image data as wireframe model data, as described in the '294 application. The gauge distances may be measured between the portions of the wireframe model data that represent the rails.

The measured gauge distance can be compared to a designated gauge distance stored in the memory device onboard the vehicle (or elsewhere) for the imaged section of the route. The designated gauge distance can be a benchmark visual profile of the route, as this distance represents a designated arrangement or spacing of the rails, sides, edges, or the like, of the route. If the measured gauge distance differs from the designated gauge distance by more than a designated threshold or tolerance, then the image analysis processor can determine that the segment of the route that is shown in the image data is misaligned. For example, the designated gauge distance can represent the distance or gauge of the route when the rails of a track were installed or last passed an inspection. If the measured gauge distance deviates too much from this designated gauge distance, then this deviation can represent a changing or modified gauge distance of the route.

Optionally, the image analysis processor may determine the gauge distance several times as the vehicle and/or aerial device(s) travel over the route, and monitor the measured gauge distances for changes. If the gauge distances change by more than a designated amount, then the image analysis processor can identify the upcoming segment of the route as being potentially misaligned. As described below, however, the change in the measured gauge distance alternatively may represent a switch in the route that the vehicle is traveling toward.

Measuring the gauge distances of the route can allow the image analysis processor to determine when one or more of the rails in the route are misaligned, even when the segment of the route includes a curve. Because the gauge distance should be constant or substantially constant (e.g., within manufacturing tolerances, such as where the gauge distances do not vary by more than 1%, 3%, 5%, or another value), the gauge distance should not significantly change in curved or straight sections of the route, unless the route is misaligned.

In one embodiment, the image analysis processor can track the gauge distances to determine if the gauge distances exhibit designated trends within a designated distance and/or amount of time. For example, if the gauge distances increase over at least a first designated time period or distance and then decrease over at least a second designated time period, or decrease over at least the first designated time period or distance and then increase over a least the second designated time period, then the image analysis processor may determine that the rails are misaligned, as described in the '847 application. Optionally, the image analysis processor may determine that the rails are misaligned responsive to the gauge distances increasing then decreasing, or decreasing then increasing, as described above, within a designated detection time or distance limit, as described in '847 application.

Figure 17:
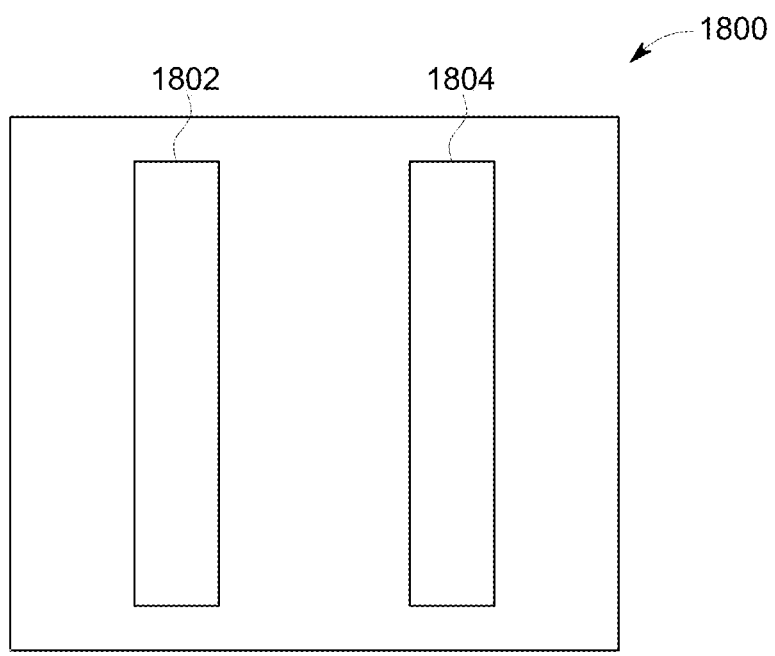
FIG. 17 illustrates an example of a benchmark visual profile.

FIG. 17 illustrates an example of a benchmark visual profile 1800. The benchmark visual profile represents a designated layout of the route 902, such as where the route is expected to be in the image data obtained by one or more of the camera units disposed onboard the aerial device and/or vehicle. In the illustrated example, the benchmark visual profile includes two designated areas 1802, 1804 that represent designated positions of rails of a track, edges or sides of a route, or other components of the route. The designated areas can represent where the pixels of the image data that represent the rails, edges, sides, or the like, of the route should be located if the rails, edges, sides, or the like, are aligned properly. For example, the designated areas can represent expected locations of the rails, edges, sides, or the like, of the route prior to obtaining the image data. With respect to rails of a track, the rails may be properly aligned when the rails are in the same locations as when the rails were installed or last passed an inspection of the locations of the rails, or at least within a designated tolerance. This designated tolerance can represent a range of locations that the rails, edges, sides, or the like, may appear in the image data due to rocking or other movements of the vehicle.

Optionally, the benchmark visual profile may represent a former image of the route obtained by a camera unit on the same or a different vehicle. For example, the benchmark visual profile may be an image or image data obtained from a camera unit onboard an aerial device flying ahead of the vehicle and the image data acquired by a camera unit disposed onboard the vehicle can be compared to the benchmark visual profile. The designated areas can represent the locations of the pixels in the former image that have been identified as representing components of the route (e.g., rails, edges, sides, or the like, of the route).

In one aspect, the image analysis processor can map the pixels representative of components of the route to the benchmark visual profile or can map the designated areas of the benchmark visual profile to the pixels representative of the route. This mapping may include determining if the locations of the pixels representative of the components of the route in the image are in the same locations as the designated areas of the benchmark visual profile.

Figure 18:
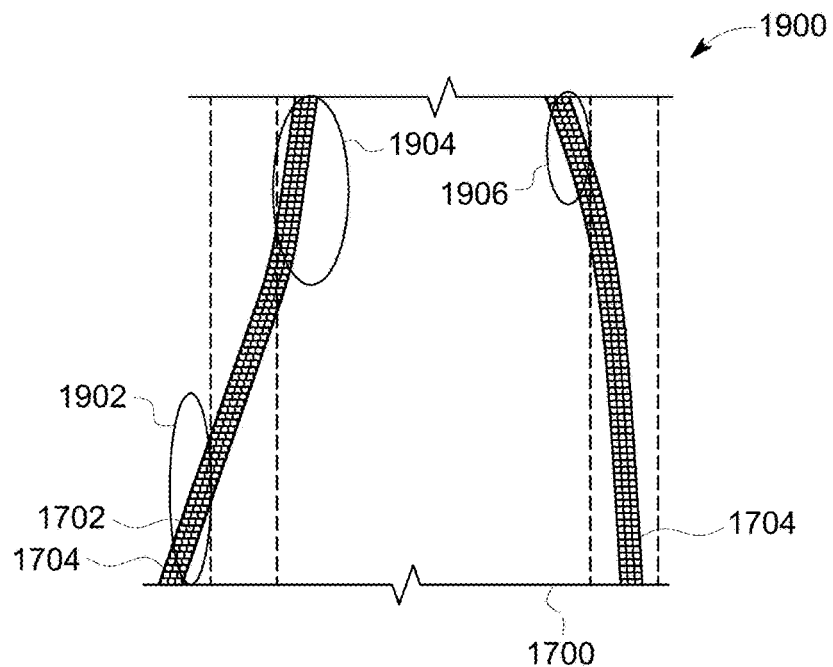
FIG. 18 illustrates a visual mapping diagram of image data and a benchmark visual profile according to one example.
Figure 19:
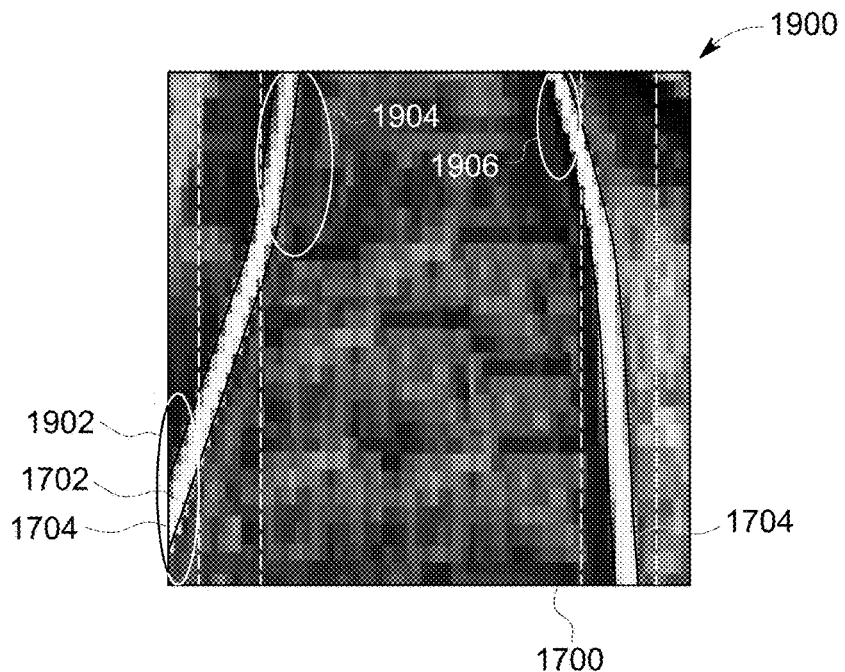
FIG. 19 illustrates another view of the visual mapping diagram shown in FIG. 18.

FIGS. 18 and 19 illustrate different views of a visual mapping diagram 1900 of the image data and the benchmark visual profile 1800 according to one example of the inventive subject matter described herein. The mapping diagram represents one example of a comparison of the image with the benchmark visual profile that is performed by the image analysis processor disposed onboard the vehicle, onboard the aerial device, and/or off-board the vehicle. As shown in the mapping diagram, the designated areas of the benchmark visual profile can be overlaid onto the image data. The image analysis processor can then identify differences between the image data and the benchmark visual profile. For example, the image analysis processor can determine whether the pixels representing the components of the route are disposed outside of the designated areas in the benchmark visual profile. Optionally, the image analysis processor can determine if locations of the pixels representing the components of the route in the image data (e.g., coordinates of these pixels) are not located within the designated areas (e.g., are not coordinates located within outer boundaries of the designated areas in the benchmark visual profile).

If the image analysis processor determines that at least a designated amount of the pixels representing one or more components of the route are outside of the designated areas in the benchmark visual profile, then the image analysis processor can identify the segment of the route that is shown in the image data as being misaligned. For example, the image analysis processor can identify groups 1902, 1904, 1906 of the pixels 1702 that represent one or more components of route as being outside of the designated areas. If the number, fraction, percentage, or other measurement of the pixels that are representative of the components of the route and that are outside the designated areas exceeds a designated threshold (e.g., 10%, 20%, 30%, or another amount), then the segment of the route shown in the image data is identified as representing a hazard (e.g., the route is misaligned, bent, or otherwise damaged). On the other hand, if the number, fraction, percentage, or other measurement of the pixels that are representative of components the route and that are outside the designated areas does not exceed the threshold, then the segment of the route shown in the image data is not identified as representing a hazard.

Figure 20:
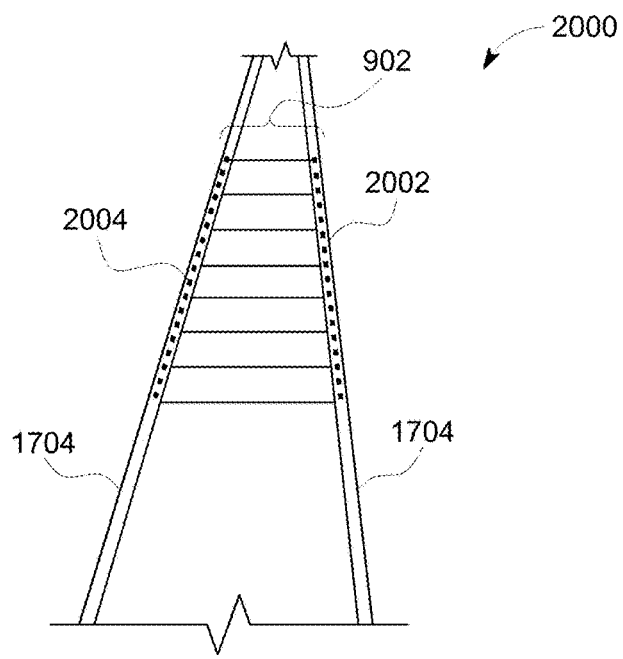
FIG. 20 illustrates image data generated by one or more camera units disposed onboard the vehicle and/or aerial devices and benchmark visual profiles of the route according to another embodiment.

FIG. 20 illustrates image data 2000 generated by one or more camera units disposed onboard the vehicle and/or aerial devices and benchmark visual profiles 2002, 2004 of the route according to another embodiment. The benchmark visual profiles 2002, 2004 can be created by the image analysis processor from the image data. For example, the image analysis processor can examine intensities of the pixels in the image data to determine the location of the route, as described above. Within the location of the route in the image data, the image analysis processor can find two or more pixels having the same or similar (e.g., within a designated range of each other) intensities. Optionally, the image analysis processor may identify many more pixels with the same or similar intensities. The benchmark visual profiles therefore may be determined without having the profiles previously created and/or stored in a memory.

The image analysis processor then determines a relationship between these pixels. For example, the image analysis processor may identify a line between the pixels in the image for each rail, side, edge, or other component or the route. These lines can represent the benchmark visual profiles shown in FIG. 20. The image analysis processor can then determine if other pixels representative of the components of the route are on or within the benchmark visual profiles (e.g., within a designated distance of the benchmark visual profiles), or if these pixels are outside of the benchmark visual profiles. In the illustrated example, most or all of the pixels representative of the rails of the route are on or within the benchmark visual profiles.

Figure 21:
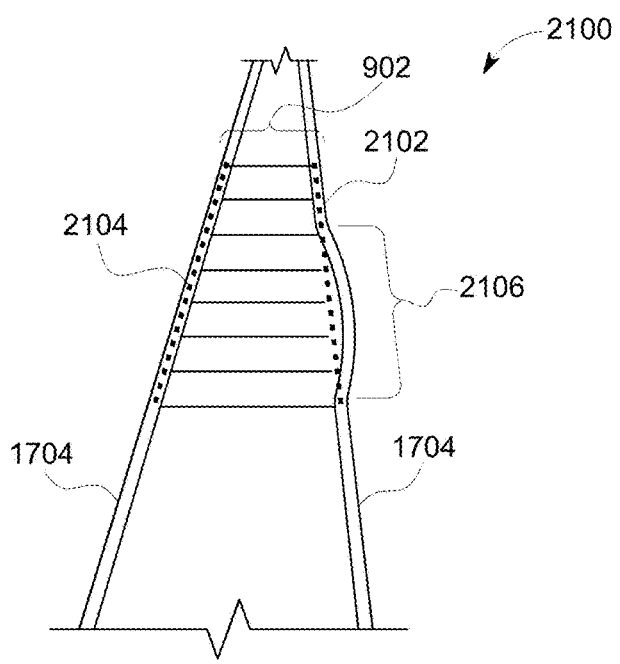
FIG. 21 illustrates other image data with benchmark visual profiles of the route according to another embodiment.

FIG. 21 illustrates other image data with benchmark visual profiles 2104, 2106 of the route 902 according to another embodiment. The benchmark visual profiles 2104, 2106 may be created using the image data obtained by one or more camera units disposed onboard the aerial device(s) and/or the vehicle, as described above in connection with FIG. 20. In contrast to the image data shown in FIG. 20, however, the image data 2100 shown in FIG. 21 shows a segment 2106 of the route that does not fall on or within the benchmark visual profile 2102. This segment 2106 curves outward and away from the benchmark visual profile 2102. The image analysis processor can identify this segment 2106 because the pixels having intensities that represent the components of the route are no longer on or in the benchmark visual profile 2102. Therefore, the image analysis processor can identify the segment 2106 as a hazard (e.g., a misaligned segment of the route) that the vehicle is traveling toward.

In one aspect, the image analysis processor can use a combination of techniques described herein for examining the route. For example, if both rails of the route are bent or misaligned from previous positions, but are still parallel or substantially parallel to each other, then the gauge distance between the rails may remain the same or substantially the same, and/or may not substantially differ from the designated gauge distance of the route. As a result, only looking at the gauge distance in the image data may result in the image analysis processor failing to identify damage (e.g., bending) to the rails. In order to avoid this situation, the image analysis processor additionally or alternatively can generate the benchmark visual profiles using the image data and compare these profiles to the image data of the rails, as described above. Bending or other misalignment of the rails may then be identified when the bending in the rails deviates from the benchmark visual profile created from the image data.

In one embodiment, responsive to the image analysis processor determining that the image data represents an upcoming hazard on the route, the image analysis processor may direct generate a warning signal to notify the operator of the vehicle of the upcoming hazard. For example, the image analysis processor can direct the control unit of the vehicle to display a warning message and/or display the image data (e.g., obtained from one or more camera units onboard the aerial device flying ahead of the vehicle and/or one or more camera units onboard the vehicle). The operator of the vehicle then may have until the vehicle moves through the safe braking distance described above to make a decision as to whether to ignore the warning or to stop movement of the vehicle. If the hazard is detected within the safe braking distance based on the image data obtained from one or more camera units of the aerial device and/or a camera unit disposed onboard the vehicle, then the operator of the vehicle may be notified by the image analysis processor of the hazard in the event that the operator has not yet spotted the hazard or is otherwise distracted, thereby allowing the operator to react to try and mitigate the hazard, such as by stopping or slowing movement of the vehicle.

As one example, the image analysis system can examine the image data using one or more techniques described in the '294 application. For example, the image analysis system can perform operations similar to the examination system described in the '294 application. The image analysis system can receive image data from one or more camera units disposed onboard one or more aerial devices and/or vehicles, convert the image data into wireframe model data, and examine changes in the wireframe model data over time and/or compare wireframe model data from image data obtained by different camera units (e.g., a camera unit onboard the aerial device and another camera unit disposed onboard the vehicle) to identify hazards in the route, predict when the route will need maintenance and/or repair, etc. The image data can be converted into the wireframe model data by identifying pixels or other locations in the image data that are representative of the same or common edges, surfaces, or the like, of objects in the image data. The pixels or other locations in the image data that represent the same objects, surfaces, edges, or the like, may be identified by the image analysis system by determining which pixels or other locations in the image data have similar image characteristics and associating those pixels or other locations having the same or similar image characteristics with each other.

The image characteristics can include the colors, intensities, luminance, locations, or other information of the pixels or locations in the image data. Those pixels or locations in the image data having colors (e.g., wavelengths), intensities, and/or luminance that are within a designated range of each other and/or that are within a designated distance from each other in the image data may be associated with each other by the image analysis system. The image analysis system can group these pixels or locations with each other because the pixels or locations in the image data likely represent the same object (e.g., a rail of a track being traveled by a rail vehicle, sides of a road, or the like).

The pixels or other locations that are associated with each other can be used to create a wireframe model of the image data, such as an image that represents the associated pixels or locations with lines of the same or similar colors, and other pixels or location with a different color. The image analysis system can generate different wireframe models of the same segment of a route from different sets of image data acquired by different camera units and/or at different times. The image analysis system can compare these different wireframe models and, depending on the differences between the wireframe models that are identified, identify and/or predict hazards such as damage to the route, and/or when maintenance and/or repair is needed for the route.

In one aspect, the image analysis system may have different predicted amounts of damage to the route associated with different changes in the wireframe data. For example, detection of a bend or other misalignment in the route based on changes in the wireframe model data may be associated with more damage to the route than other types of changes in the wireframe model data. As another example, the changing of a solid line in earlier wireframe model data to a segmented line in later wireframe model data can be associated with different degrees of damage to the route based on the number of segments in the segmented line, the size of the segments and/or gaps between the segments in the segmented line, the frequency of the segments and/or gaps, or the like. Based on the degree of damage identified from changes in the wireframe model data, the image analysis system may automatically order maintenance and/or repair of the route.

Figure 22:
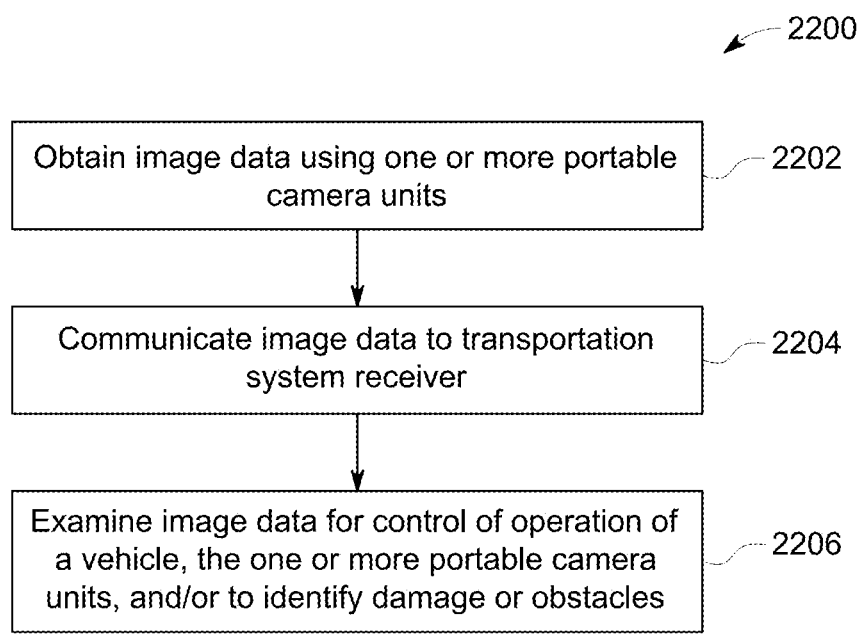
FIG. 22 illustrates a flowchart of one embodiment of a method for identifying route-related hazards.

FIG. 22 illustrates a flowchart of one embodiment of a method 2200 for identifying route-related hazards. The method may be practiced by one or more embodiments of the systems described herein. At 2202, image data is obtained using one or more camera units. As described above, the portable camera units may be coupled to or otherwise disposed onboard one or more aerial devices flying outside of a vehicle. For example, the aerial device may fly ahead of the vehicle along a direction of travel to capture images and/or video of portions of the route being traveled by the vehicle ahead of the vehicle.

At 2204, the image data is communicated to the transportation system receiver. For example, the image data can be wirelessly communicated from the aerial device to the transportation system receiver disposed onboard the vehicle. The image data can be communicated as the image data is obtained, or may be communicated responsive to the vehicle and/or the aerial device entering into or leaving a designated area, such as a geo-fence.

At 2206, the image data is examined for one or more purposes, such as to control or limit control of the vehicle, to control operation of the camera unit, to identify damage to the vehicle, the route ahead of the vehicle, or the like, and/or to identify obstacles in the way of the vehicle. For example, if the camera unit is disposed onboard an aerial device flying ahead of the vehicle, then the image data can be analyzed to determine whether a hazard exists between ahead of the vehicle An image analysis system can examine the image data and, if it is determined that one or more hazards are disposed ahead of the vehicle, then the image analysis system can generate a warning signal that is communicated to the control unit of the vehicle. This warning signal can be received by the control unit and, responsive to receipt of this control signal, the control unit can prevent movement of the vehicle. For example, the control unit may disregard movement of controls by an onboard operator to move the vehicle, the control unit may engage brakes and/or disengage a propulsion system of the vehicle (e.g., turn off or otherwise deactivate an engine, motor, or other propulsion-generating component of the vehicle). In one aspect, the image analysis system can examine the image data to determine if the route is damaged (e.g., the rails on which a vehicle is traveling are broken, bent, or otherwise damaged), if obstacles are on the route ahead of the vehicle (e.g., another vehicle or object on the route), or the like.

Other embodiments relate to aperture-coupled microstrip antennas that are relatively low cost, light weight, high gain, and which may be suitable for use as a broadband, long range L/S band antenna. The antenna can be used in unmanned aerial vehicle systems, such as those described elsewhere herein (e.g., the antenna can be part of equipment 103). Alternatively or additionally, the antenna may be used to transmit electromagnetic signals to detect such hazards or other features of interest. In both cases, the low weight of the antenna would facilitate its use in unmanned aerial vehicles, e.g., the unmanned aerial vehicle could be made smaller and/or would have a longer operational range versus using heavier antennas. Also, a higher bandwidth would improve operations of an unmanned aerial vehicle in terms of data collection and communication, versus antennas having lower bandwidths.

In an embodiment, an antenna includes a radiating patch layer and an aperture layer. The aperture layer is conductive and defines an aperture. Providing an aperture (e.g., slot) increases the passive gain of the antenna, and depending on the area and shape of the aperture, may positively affect the signal transmission characteristics of the antenna, e.g., reduced or eliminated side lobes (unwanted radiation in undesired directions), which results in less antenna loss. The antenna further includes a first insulator layer (e.g., a first non-conductive or dielectric layer) that is sandwiched between the radiating patch layer and the aperture layer, such that the radiating patch layer and the aperture layer are spaced apart from one another by at least of thickness of the first insulator layer. The first insulator layer has a low dielectric constant. Use of a low dielectric constant spaced layer between the patch layer and the aperture layer results in the antenna having a higher bandwidth and increased gain versus antennas without such a spaced layer. The antenna further includes a conductive feed line, and a second insulator layer sandwiched between the aperture layer and the feed line. (The antenna may include other antenna elements as described below.) The feed line and various layers are parallel to one another and are stacked on top of one another.

Figure 23:
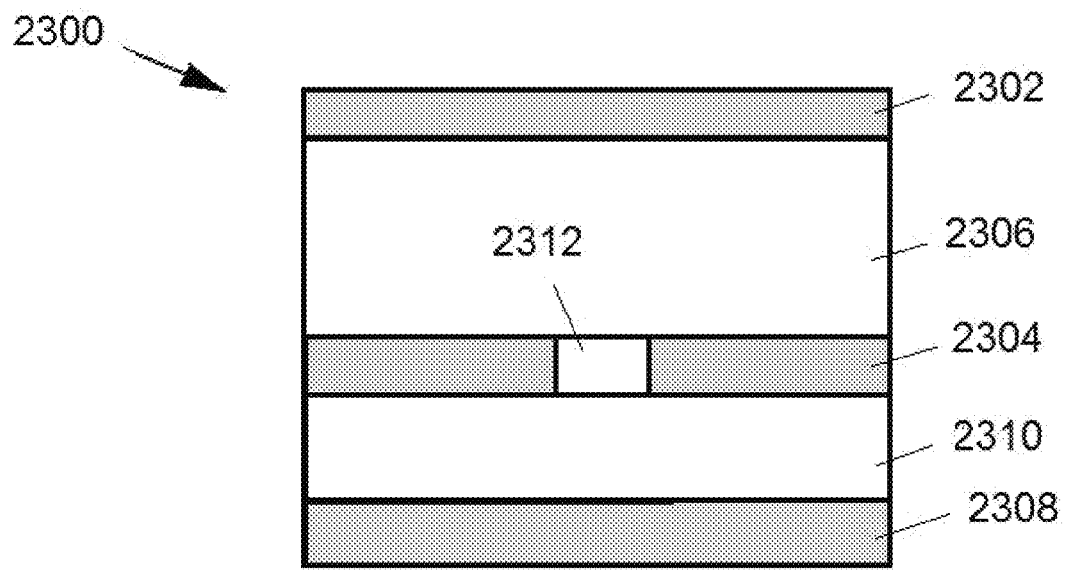
FIG. 23 is a side elevation, cross-sectional schematic diagram of an antenna, according to an embodiment of the invention.
Figure 24:
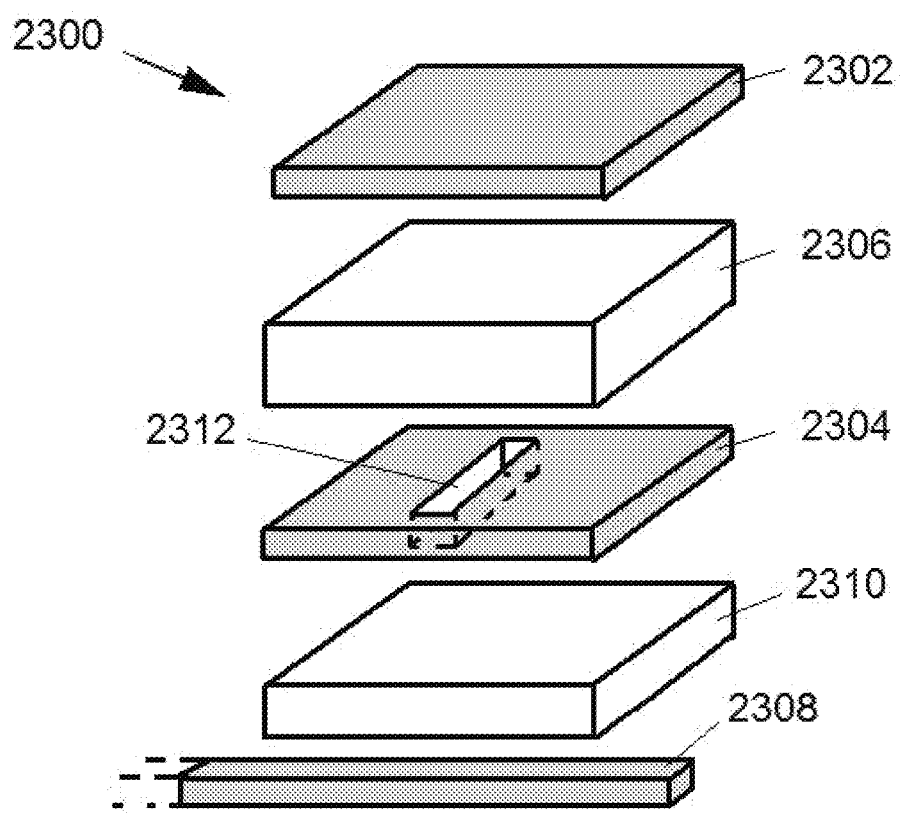
FIG. 24 is an exploded perspective view of the antenna of FIG. 23.

FIGS. 23 and 24 (not to scale) illustrate an embodiment of an antenna 2300, such as might be used, for example, for remote sensing with unmanned aerial vehicle technology. The antenna includes a radiating patch layer 2302, an aperture layer 2304, a first insulator layer 2306 sandwiched between the radiating patch layer and the aperture layer, a feed line 2308, and a second insulator layer 2310 sandwiched between the feed line and the aperture layer. The aperture layer is made of a conductive material (e.g., metal), which defines an aperture 2312.

Figure 25:
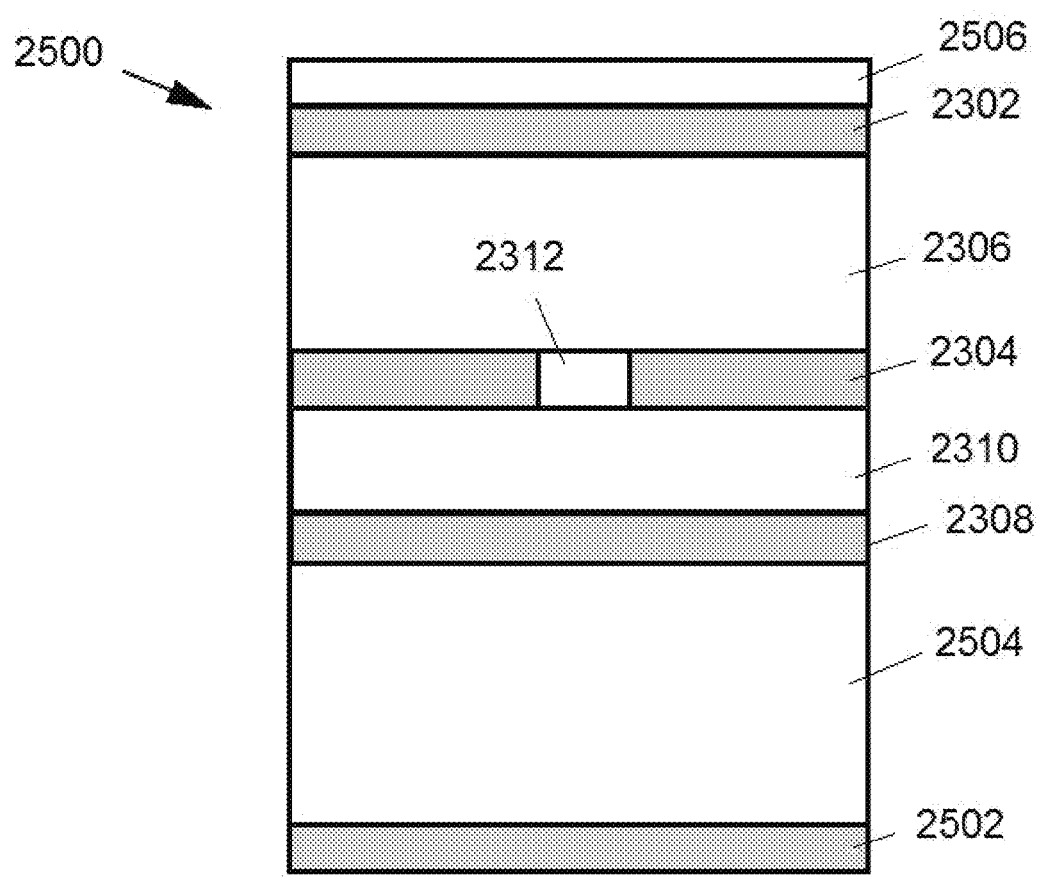
FIG. 25 is a side elevation, cross-sectional schematic diagram of another embodiment of an antenna.
Figure 26:
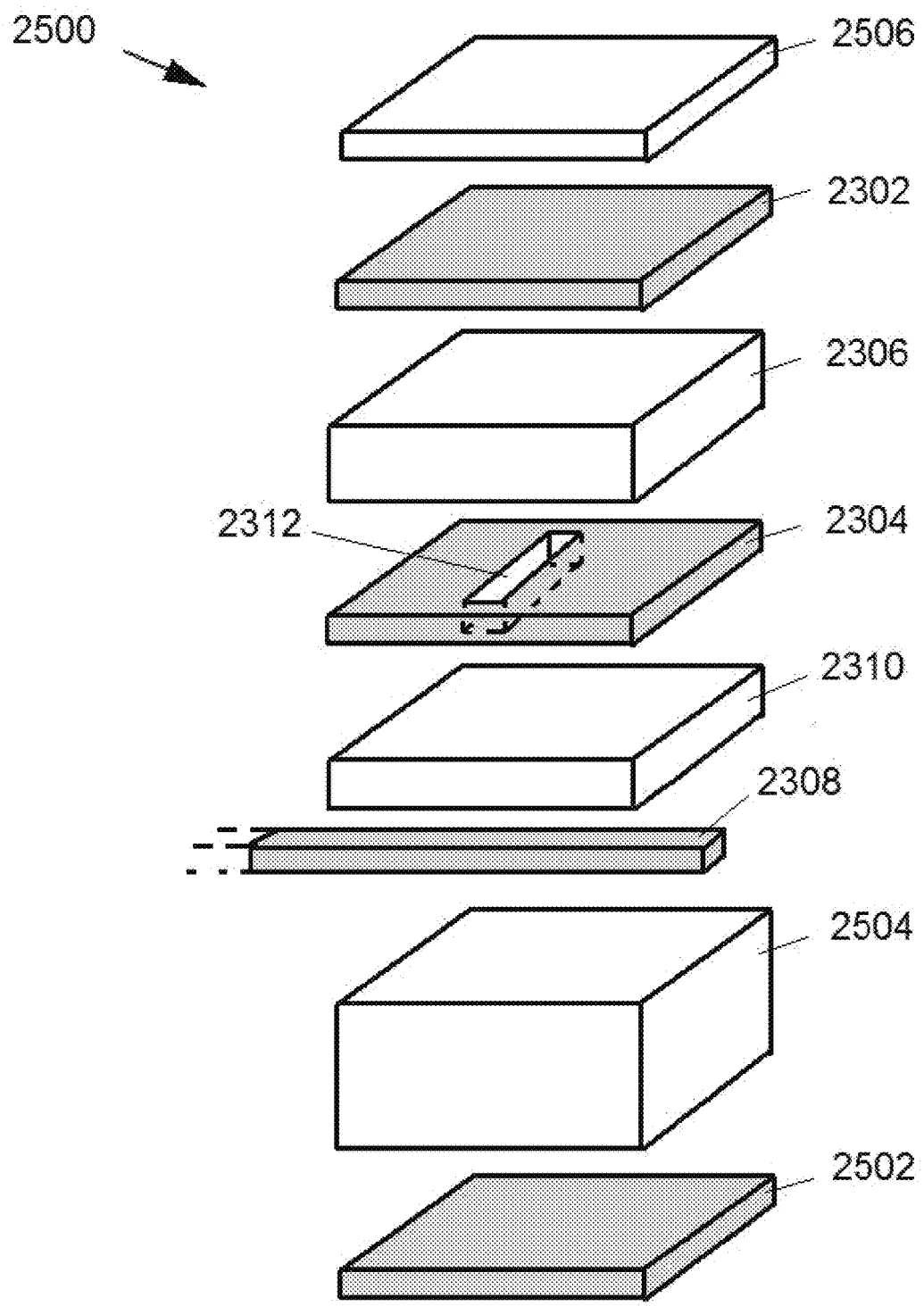
FIG. 26 is an exploded perspective view of the antenna of FIG. 25.

FIGS. 25 and 26 (not to scale) illustrate another embodiment of an antenna 2500, again, such as might be used, for example, for remote sensing with unmanned aerial vehicle technology. Like the antenna 2300, the antenna 2500 includes a radiating patch layer 2302, an aperture layer 2304, a first insulator layer 2306 sandwiched between the radiating patch layer and the aperture layer, a feed line 2308, and a second insulator layer 2310 sandwiched between the feed line and the aperture layer. The aperture layer is made of a conductive material (e.g., metal), which defines an aperture 2312. The antenna 2500 also includes a ground plane layer 2502 and a third insulator layer 2504. The third insulator layer 2504 is sandwiched between the feed line and the ground plane layer. Like the first insulator layer, the third insulator layer also has a low dielectric constant, which may be the same as or different from the low dielectric constant of the first insulator layer (i.e., the first and third insulator materials may be the same material, or different materials that both have respective low dielectric constants). The antenna 2500 also includes a radome 2506 covering at least the radiating patch layer.

The antenna 2300 is suitable for general use in numerous applications. The antenna 2500, because of the ground plane and third insulator layer, may have a higher gain and lower loss. Also, the third insulator layer (e.g., having a thickness equal to one-quarter of a wavelength of a frequency associated with the antenna) may serve to create zero side lobes, or at least reduce the extent of side lobes, thereby reducing loss.

Figure 27:
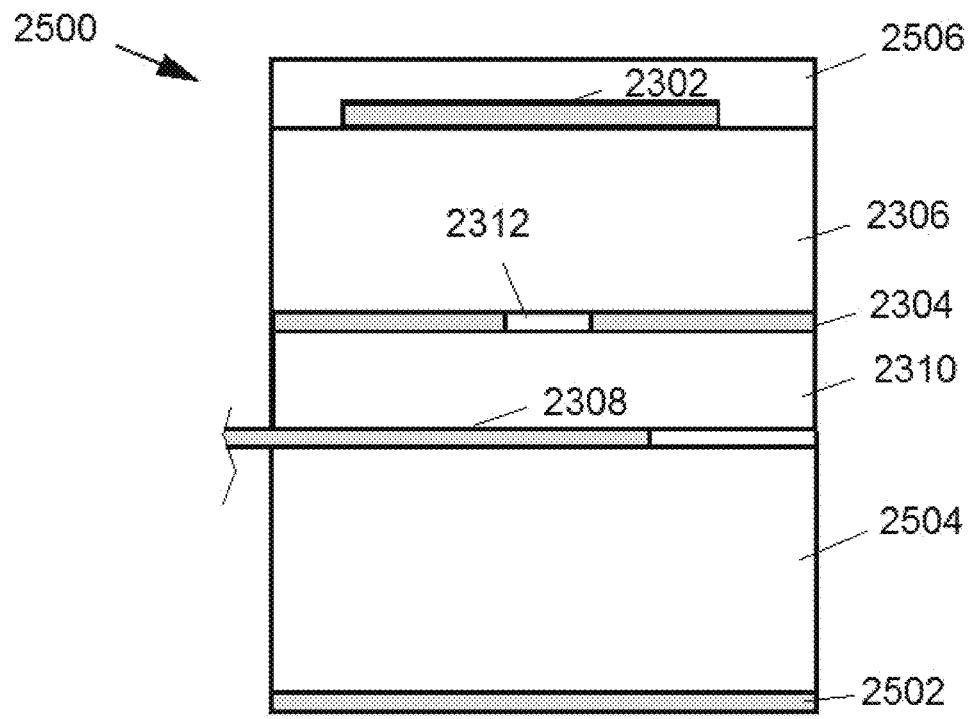
FIG. 27 is a side elevation, cross-sectional schematic diagram of another embodiment of an antenna.
Figure 28:
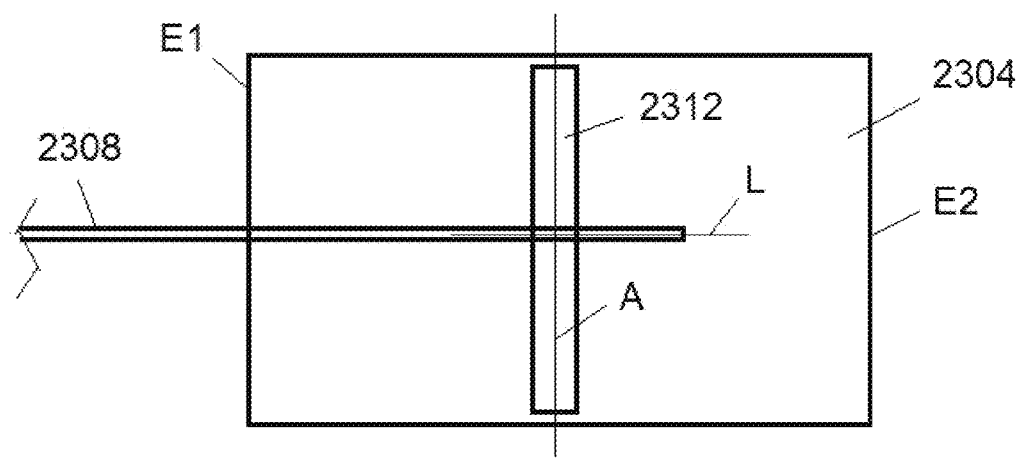
FIG. 28 is a top plan, schematic view of part of the antenna of FIG. 27.
Figure 29A:
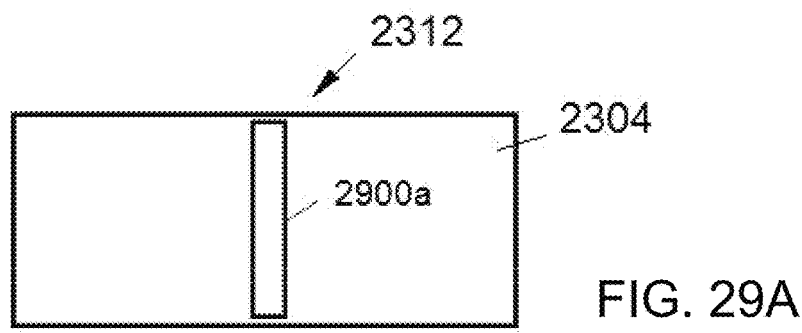
FIGS. 29A, 29B, 29C, 29D, and 29E show the shapes of various apertures in a planar conductive aperture layer of an antenna, according to embodiments of the invention.
Figure 29B:
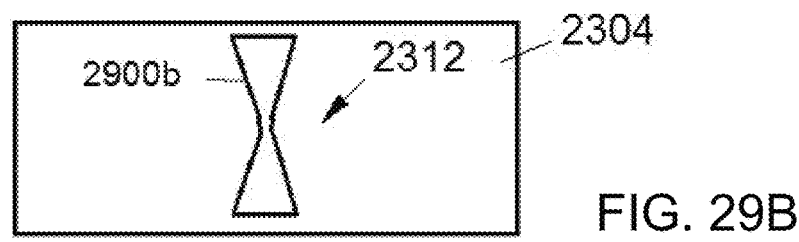
Figure 29C:
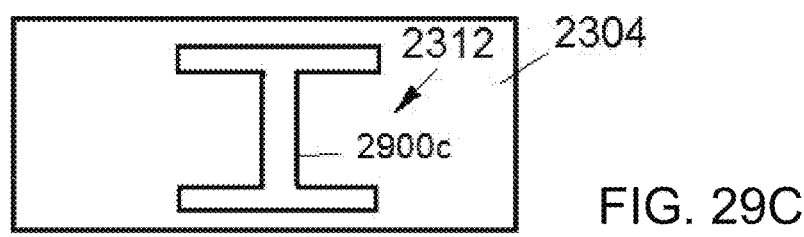
Figure 29D:
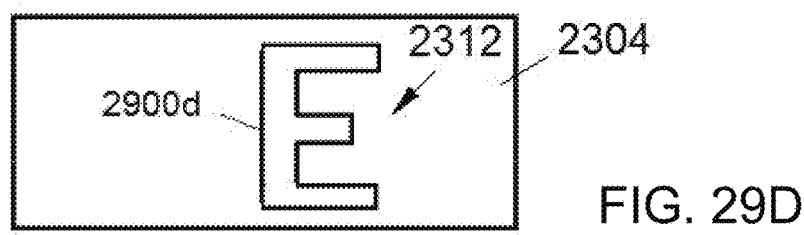
Figure 29E:
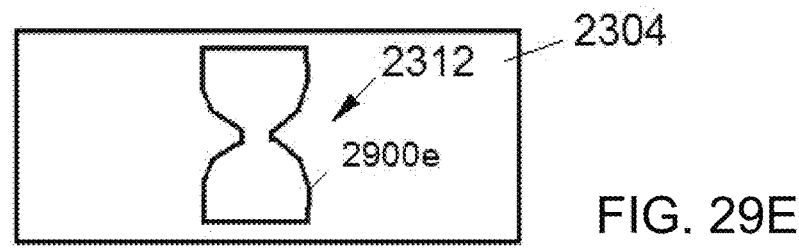

As shown in FIGS. 27 and 28, the feed line 2308 may end short of one side of the antenna, i.e., it may not extend all the way across a width or length of the antenna. For example, the feed line may comprise a metal conductor having a long axis "L" oriented transverse (perpendicular) to an axis "A" of the aperture, with the feed line extending from past a first outer edge "E1" of the aperture layer to past the aperture 2312 and terminating before a second outer edge "E2" of the aperture layer that is opposite the first outer edge. In the other direction (extending away from both E1 and E2), and as indicated by the illustrated break line on the left end of 2308, the feed line may extend for connection to a transmitter/receiver or other electrical circuit. The feed line may have a dimension (e.g., total length, or length from the aperture to edge E2, or length from the aperture to where the feed line terminates past edge E1) corresponding to one-quarter of a wavelength of a frequency associated with the antenna. The frequency associated with the antenna may be within a range of frequencies in which the antenna is intended and designed to operate, e.g., a frequency from 3.2 to 3.6 GHz or thereabouts for an S band antenna, or a frequency from 1.2 to 1.375 GHz or thereabouts for an L band antenna.

The gain of the antenna is a function of the slot size (area) and shape. The orientation of the feed line affects how the feed line couples with the radiating elements (radiating patch layer). Having a feed line whose length (e.g., length of feed line from the aperture to where the feed line is connected to a transmitter) is less than one-quarter of a wavelength of a frequency associated with the antenna, which is oriented transverse to a long axis of the slot or other aperture, and which extends past the aperture, will reduce side lobes, reduce associated loss, and increase the overall gain of the antenna.

Further with reference to FIGS. 27 and 28, the antenna body (the stacked layers less the portion of the feed line that extends away from the rest of the stacked layers) may be rectangular or square in overall shape (from a top plan perspective as shown in FIG. 28). Thus, each of the layers 2502, 2504, 2310, 2304, 2306, and 2302 may have a top-plan shape that corresponds to the overall rectangular or square shape of the antenna body as a whole. As shown in FIG. 27, the radiating patch 2302 may have a smaller area than other layers, i.e., it may be rectangular or square and/or be similarly proportioned as other layers, but smaller in overall area. Alternatively, the radiating patch may be the same size, or just slightly smaller to accommodate complete/edge covering by the radome. In embodiments, the overall width and/or length of the antenna body (i.e., from the top-plan perspective of FIG. 28 may be from 1 cm to 3 cm (e.g., 1 cm long and 2.54 cm width, or, e.g., 2.9 cm long and 2.54 cm wide).

The aperture layer may be a conductive metal sheet with the aperture formed therein, extending completely through the sheet from top to bottom (i.e., the aperture is a shaped hole in the sheet). As shown in FIG. 28 and elsewhere, the aperture may be rectangular (from a top plan perspective), i.e., slot-shaped, with a long axis perpendicular to a long axis of the feed line. In one embodiment, the rectangular aperture may be centrally positioned on the aperture layer, that is, positioned in the middle of the aperture layer such that the length of the aperture layer on either side of the aperture is equal. The antenna normally has a passive gain based on an area and a shape of the aperture of the aperture layer (e.g., gain increases with a reduced slot area). With reference to FIGS. 29A-29E, the possible shapes of the aperture (the shape normal to a major planar surface of the body of the aperture layer, i.e., from a top plan perspective) include a slot 2900a, a bowtie 2900b, an H-shape 2900c, an E-shape 2900d, or an hour glass 2900e.

In an embodiment, the radiating patch layer 2302 is comprised of a conductive metal such as brass, copper, stainless steel, gold, etc. The radiating patch layer is not directly electrically connected to other conductive elements in the antenna (e.g., there are no wires connecting it to other elements), instead, it may interact with other conductive elements via electromagnetic fields within the antenna. In embodiments, the radiating patch layer has the same area and dimensions as the aperture layer.

The first insulator layer 2306 is sandwiched between the radiating patch layer and the aperture layer, such that the radiating patch layer and the aperture layer are spaced apart from one another by at least the thickness of the first insulator layer. (The distance between the radiating patch layer and the aperture layer also can have a direct effect on the broadband capability of the antenna.) In one aspect, the radiating patch layer and the aperture layer are spaced apart by at least 4 mm. In one aspect, the radiating patch layer and the aperture layer are spaced apart by a distance of from 4.0 mm to 5.5 mm, representing a distance suitable for an S band antenna. In one aspect, the radiating patch layer and the aperture layer are spaced apart by a distance of from 19 mm to 20 mm, representing a distance suitable for an L band antenna. In one aspect, the radiating patch layer and the aperture layer are separated only by insulating or non-conductive layers, such that there are no intervening conductive layers between the radiating patch layer and the aperture layer. In another aspect, the radiating patch layer and the aperture layer are separated only by the single first insulator layer (i.e., a solid block of the material of the insulator layer) and two very thin (e.g., 0.05 mm) layers of bonding film or other adhesive, i.e., one to adhere the insulator layer to the radiating patch layer and another to adhere the insulator layer to the aperture layer. The first insulator layer has a low dielectric constant, which means a dielectric constant of no more than 1.5. In one embodiment, the low dielectric constant is less than 1.2.

In the embodiment of the antenna 2500 that includes the ground plane layer 2502, the third insulator layer 2504 is sandwiched between the feed line and the ground plane layer. Like the first insulator layer, the third insulator layer also has a low dielectric constant, which may be the same as or different from the low dielectric constant of the first insulator layer (i.e., the first and third insulator materials may be the same material, or different materials that both have respective low dielectric constants). In one aspect, the ground plane layer and the feed line are spaced apart by at least 22 mm. In one aspect, the ground plane layer and the feed line are spaced apart by a distance of from 22 mm to 23 mm, representing a distance suitable for an S band antenna. In one aspect, the ground plane layer and the feed line are spaced apart by a distance of from 59 mm to 61 mm, representing a distance suitable for an L band antenna. In one aspect, the ground plane layer and the feed line are separated only by insulating or non-conductive layers, such that there are no intervening conductive layers between the ground plane layer and the feed line. In another aspect, the ground plane layer and the feed line are separated only by the single third insulator layer (i.e., a solid block of the material of the insulator layer) and two very thin (e.g., 0.05 mm) layers of bonding film or other adhesive, i.e., one to adhere the insulator layer to the ground plane layer and another to adhere the insulator layer to the feed line.

Suitable materials for the first insulator layer 2306 and the third insulator layer 2504 include ROHACELL® HF (e.g., ROHACELL® HF 71) or another closed-cell rigid foam or other solid foam. ROHACELL® HF closed-cell rigid foam is available from Evonik Industries. See http://www.rohacell.com/sites/lists/RE/DocurnentsHP/ROHACELL%20HF%20Product%20Information.pdf, which is hereby incorporated herein by reference.

Additionally, the third insulator layer 2504 may have a thickness corresponding to one-quarter of a wavelength of a frequency associated with the antenna. As noted above, the frequency associated with the antenna may be within a range of frequencies in which the antenna is intended and designed to operate, e.g., a frequency from 3.2 to 3.6 GHz for an S band antenna, or a frequency from 1.2 to 1.375 GHz for an L band antenna. Thus, for example, one-quarter of a wavelength of a 3.2 GHz frequency (S band antenna) would be approximately a 23.5 mm thickness of the third insulator layer 2504, and one-quarter of a wavelength of a 1.2 GHz frequency (L band antenna) would be approximately a 60 mm thickness of the third insulator layer 2504.

Figure 30:
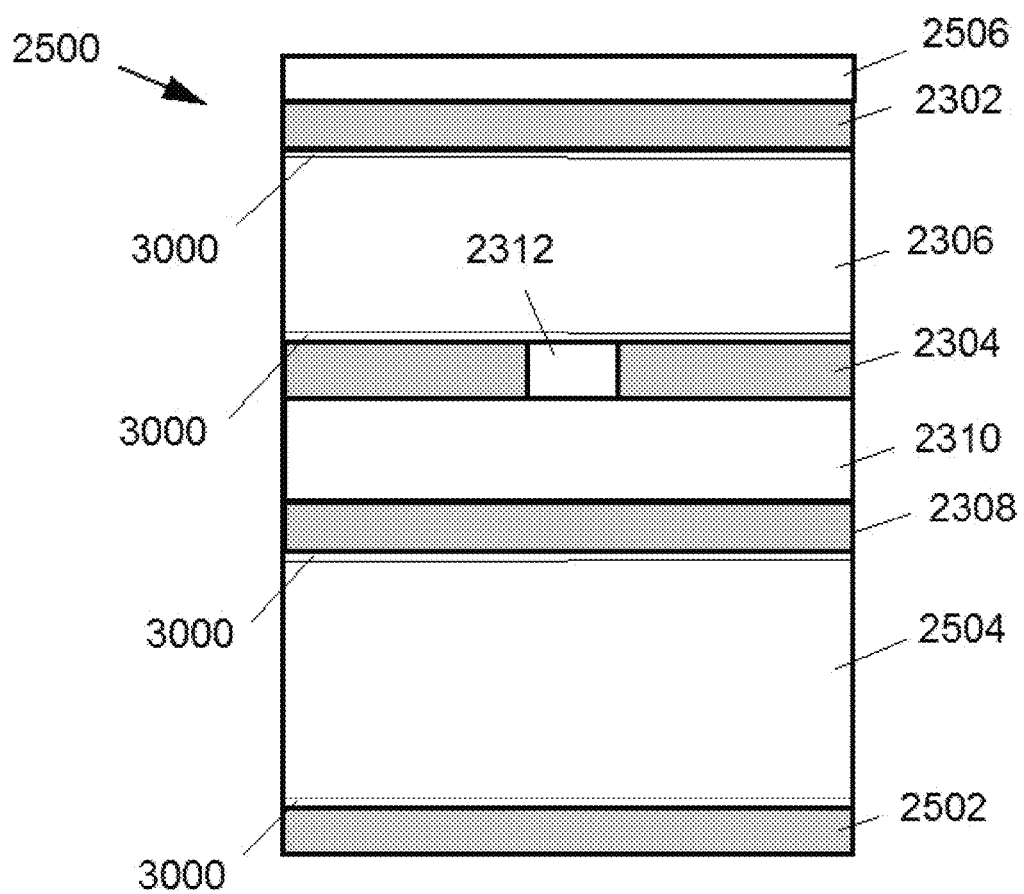
FIG. 30 is a side elevation, cross-sectional schematic diagram of an antenna, according to an embodiment of the invention.

The first insulator layer 2306 may be adhered to the radiating patch layer by a first bonded layer (layer of bonding film or other adhesive) and to the aperture layer by a second bonded layer (layer of bonding film or other adhesive), and the third insulator layer 2504 may be adhered to the feed line by a third bonded layer (layer of bonding film or other adhesive) and to the ground plane layer by a fourth bonded layer (layer of bonding film or other adhesive). The bonded layers are shown as elements 3000 in FIG. 30 (not to scale). The first bonded layer, second bonded layer, third bonded layer, and fourth bonded layer may all have a low dielectric constant. In one embodiment, each bonded layer comprises 3M™-brand 4959 bonding film.

The feed line and the aperture layer are spaced apart by at least the thickness of the second insulator layer 2310. In an embodiment, the second insulator layer is from 0.2 mm to 0.4 mm (e.g., 0.3 mm) thick, for an S band antenna. In another embodiment, the second insulator layer is from 0.7 mm to 0.9 mm (e.g., 0.8 mm) thick, for an L band antenna. The second insulator layer may be an RO4000® series hydrocarbon ceramic laminate available from Rogers Corporation (e.g., having a dielectric constant of 3.38 or thereabouts). The feed line and aperture layer may be affixed to the second insulator layer as a printed circuit. Alternatively, the feed line and aperture may be otherwise adhered to the second insulator layer using bonding film or other adhesive layers. In one aspect, the feed line and the aperture layer are separated only by insulating or non-conductive layers, such that there are no intervening conductive layers between the feed line and the aperture layer. In another aspect, the feed line and the aperture layer are separated only by the single second insulator layer (i.e., a solid block of the material of the insulator layer), such as in a double-sided printed circuit board configuration. In another aspect, the feed line and the aperture layer are separated only by the single second insulator layer and two very thin (e.g., 0.05 mm) layers of bonding film or other adhesive, i.e., one to adhere the insulator layer to the feed line and another to adhere the insulator layer to the aperture layer.

In embodiments with the radome 2506, the radome is provided for protection purposes, e.g., it comprises a structure for protecting the radiating patch and is made from material transparent to radio waves. The material of the radome may comprise the aforementioned RO4000® series hydrocarbon ceramic laminate. In an embodiment, the radome is relatively thin, e.g., 0.2 mm thick or thereabouts. In an embodiment, the radiating patch is adhered to or part of the radome as a printed circuit.

In embodiments, the antenna has a frequency bandwidth ranging from 5-50% octaves. The frequency bandwidth of the antenna is normally a function of a thickness of the first insulator layer, a thickness of the second insulator layer, and a thickness of the third insulator layer. In embodiments, the antenna additionally or alternatively has a passive gain of at least 10 dB. Additionally, in embodiments, the antenna additionally or alternatively can be oriented vertically or horizontally with less than a 10% differences in the polarity.

The conductive layers 2302, 2304, 2308, and 2502 may each be a conductive metal film (brass, copper, stainless steel, gold, etc.) One or more of the conductive layers (or all of the conductive layers) may be relatively thin, e.g., from 0.01 mm to 0.02 mm thick. The ground layer 2502 is typically electrically connected to an electrical ground.

In an embodiment, the radiating patch layer, the aperture layer, and the ground plane layer are planar and have respective thicknesses of no more than 1/100 of a respective minimum cross dimension of the radiating patch layer, the aperture layer, or the ground plane layer. The minimum cross dimension across the layer in any direction, from a top plan perspective, e.g., in the case of a thin, rectangular sheet it would be the width of the sheet, and in the case of a circular sheet it would be the diameter of the sheet. This represents that the conductive layers are very thin relative to, for example, the length or width of the layer.

The layers 2302, 2304, 2306, 2310, 2502, and 2504 may each be planar, meaning having two major surfaces (e.g., top and bottom surfaces) that are parallel to one another and flat; 'major surface' refers to sides of the layer that define the largest single-plane surface area of the layer.

As should be appreciated, although the layers 2306, 2310, and 2504 are referred to herein as insulator layers, they can also be considered or characterized as non-conductive spacers or dielectric spacers, i.e., a solid, non-conductive material with a low dielectric constant.

In an embodiment, a microstrip antenna includes the following stacked, parallel layers in order from 'bottom' to 'top,' with no other intervening layers or components: the ground plane layer 2502; a layer of bonding film or other adhesive; the third insulator layer 2504; another layer of bonding film or other adhesive; the feed line 2308; the second insulator layer 2310; the aperture layer 2304 (having a slot or other aperture); another layer of bonding film or other adhesive; the first insulator layer 2306; another layer of bonding film or other adhesive; the radiating patch layer 2302; the radome 2506; and the antenna may include other layers of bonding film or other adhesive for adhering the second insulator layer and radome, if needed. As described above, the feed line may be transverse to the aperture, and extend past the aperture but not as far as the edge of the antenna.

In an embodiment, an S band microstrip antenna (e.g., bandwidth of 3.2 to 3.6 GHz) includes the following stacked, parallel layers in order from 'bottom' to 'top,' with no other intervening layers or components: the ground plane layer 2502; a layer of bonding film or other adhesive; the third insulator layer 2504 having a thickness of 22 mm to 23 mm; another layer of bonding film or other adhesive; the feed line 2308; the second insulator layer 2310 having a thickness of 0.2 mm to 0.4 mm (e.g., 0.3 mm); the aperture layer 2304 (having an aperture); another layer of bonding film or other adhesive; the first insulator layer 2306 having a thickness of 4.5 mm to 5.5 mm (e.g., 5.0 mm plus or minus 0.1 mm); another layer of bonding film or other adhesive; the radiating patch layer 2302; the radome 2506 (e.g., having a thickness of 0.8 mm); and the antenna may include other layers of bonding film or other adhesive for adhering the second insulator layer and radome, if needed. As described above, the feed line may be transverse to the aperture, and extend past the aperture but not as far as the edge of the antenna.

In an embodiment, an L band microstrip antenna (e.g., bandwidth of 1.2 to 1.375 GHz) includes the following stacked, parallel layers in order from 'bottom' to 'top,' with no other intervening layers or components: the ground plane layer 2502; a layer of bonding film or other adhesive; the third insulator layer 2504 having a thickness of 59 mm to 61 mm (e.g., 60 mm); another layer of bonding film or other adhesive; the feed line 2308; the second insulator layer 2310 having a thickness of 0.7 mm to 0.9 mm (e.g., 0.8 mm); the aperture layer 2304 (having an aperture); another layer of bonding film or other adhesive; the first insulator layer 2306 having a thickness of 18 mm to 20 mm (e.g., 19 mm or thereabouts); another layer of bonding film or other adhesive; the radiating patch layer 2302; the radome 2506 (e.g., having a thickness of 0.8 mm); and the antenna may include other layers of bonding film or other adhesive for adhering the second insulator layer and radome, if needed. As described above, the feed line may be transverse to the aperture, and extend past the aperture but not as far as the edge of the antenna.

The entirety of any of the embodiments of the antennas disclosed herein may be housed in an outer housing, such as an RF-transparent polymer housing.

In an embodiment, an antenna includes a planar radiating patch layer. The radiating patch layer is made of a first conductive metal. The antenna also includes a planar aperture layer. The aperture layer is made of a second conductive metal and defines an aperture. The antenna also includes a first planar insulator layer sandwiched between the radiating patch layer and the aperture layer. The radiating patch layer and the aperture layer are spaced apart from one another by at least a thickness of the first insulator layer. The first insulator layer has a dielectric constant of no more than 1.5. There are no conductive elements disposed between the radiating patch layer and the aperture layer. The antenna also includes a conductive feed line. A long axis of the conductive feed line is transverse to a long axis of the aperture. The feed line extends from past a first outer edge of the aperture layer to past the aperture. The feed line terminates before a second outer edge of the aperture layer that is opposite the first outer edge. The antenna also includes a second planar insulator layer sandwiched between the aperture layer and the feed line. There are no conductive elements disposed between the feed line and the aperture layer. The antenna also includes a planar ground plane layer made of a third conductive metal. The antenna also includes a third planar insulator layer sandwiched between the feed line and the ground plane layer. The third insulator layer has a dielectric constant of no more than 1.5. There are no conductive elements disposed between the feed line and the ground plane layer. The antenna also includes a radome covering at least the radiating patch layer. The radiating patch layer, the first insulator layer, the aperture layer, the second insulator layer, the conductive feed line, the third insulator layer, and the ground plane layer are all parallel to and stacked on top of one another. The first, second, and third conductive metals may be the same type of metal or different metals. The feed line is also made of a conductive metal, which may be the same type of metal or a different metal. In another embodiment, the aperture is rectangular; the first planar insulator layer and the third planar insulator layer comprise a solid foam material; and a thickness of the third planar insulator layer is equal to one-quarter of a wavelength of a frequency associated with the antenna.

In one embodiment, a system (e.g., an aerial camera system) includes a first aerial device, a first camera unit, and one or more image analysis processors. The first aerial device is configured to be disposed onboard a non-aerial vehicle as the non-aerial vehicle moves along a route. The first aerial device also can be configured to fly above the route during movement of the vehicle along the route. The first camera unit is configured to be disposed onboard the first aerial device and to generate first image data during flight of the first aerial device. The one or more image analysis processors are configured to examine the first image data and to identify a hazard disposed ahead of the non-aerial vehicle along a direction of travel of the non-aerial vehicle based on the first image data.

In one aspect, the first camera unit can be configured to generate the first image data representative of a segment of the route disposed ahead of the non-aerial vehicle and the one or more image analysis processors are configured to examine the segment of the route based on the first image data.

In one aspect, the one or more image analysis processors are configured to be disposed onboard the non-aerial vehicle and the first aerial device is configured to wirelessly communicate the first image data to the one or more image analysis processors during flight of the first aerial device off of the non-aerial vehicle.

In one aspect, the first camera unit is configured to be a forward-facing camera unit of the first aerial device that generates the first image data representative of an area ahead of the first aerial device along a direction of travel of the first aerial device. The system also can include one or more of a downward-facing camera unit configured to be disposed onboard the first aerial device and oriented in a downward direction to generate second image data representative of a portion of the route that is beneath the first aerial device or a rearward-facing camera unit configured to be disposed onboard the first aerial device and oriented in a rearward direction to generate third image data representative of a portion of the route that is between the first aerial device and the non-aerial vehicle.

In one aspect, the first aerial device is configured to communicate one or more of the second image data or the third image data to the one or more image analysis processors during flight of the first aerial device. The one or more image analysis processors can be configured to examine the one or more of the second image data or the third image data to identify the hazard.

In one aspect, the one or more image analysis processors are configured to receive the first image data generated by the first camera unit during flight of the first aerial device and to identify at least one of a broken component of the route or an obstacle on the route based on the first image data.

In one aspect, the system also includes a control unit configured to control the flight of the first aerial device. The control unit can be configured to autonomously prevent the first aerial device from flying outside of a three dimensional movement envelope disposed ahead of the non-aerial vehicle during the movement of the non-aerial vehicle.

In one aspect, the system also includes a second aerial device and a third aerial device, where each of the first aerial device, the second aerial device, and the third aerial device is configured to dock on the non-aerial vehicle to be charged by and travel with the non-aerial vehicle during movement of the non-aerial vehicle. During a time period that the first aerial device is flying off of the non-aerial vehicle, the second aerial device can be charged and landed on the non-aerial device and the third aerial device can be landed on and be in the process of being charged by the non-aerial device.

In one aspect, the non-aerial vehicle is a rail vehicle, and the route is a track on which the rail vehicle is configured to travel. The one or more image analysis processors can be configured to be disposed onboard the rail vehicle and the first aerial device configured to wirelessly communicate the first image data to the one or more image analysis processors during flight of the first aerial device off of the rail vehicle. The one or more image analysis processors also can be configured to receive the first image data generated by the first camera unit during flight of the first aerial device and to identify at least one of a broken component of the track or an obstacle on the track based on comparing the first image data to a benchmark visual profile of the track.

In another embodiment, a method (e.g., a method for identifying route-related hazards) includes generating first image data from a first camera unit disposed onboard a first aerial device that is configured to land on a non-aerial vehicle during movement of the non-aerial vehicle along a route. The first image data can be generated during flight of the first aerial device above the route being traveled by the non-aerial vehicle. The method also can include examining (using one or more image analysis processors) the first image data to identify a hazard disposed ahead of the non-aerial vehicle along a direction of travel of the non-aerial vehicle based on the first image data.

In one aspect, the first image data represents a segment of the route disposed ahead of the non-aerial vehicle and the hazard is identified by the one or more image analysis processors by examining the segment of the route based on the first image data.

In one aspect, the method also can include wirelessly communicating the first image data from the first aerial device to the one or more image analysis processors during flight of the first aerial device off of the non-aerial vehicle.

In one aspect, the first image data represents of an area ahead of the first aerial device along a direction of travel of the first aerial device, and the method also can include one or more of generating second image data from a downward-facing camera unit disposed onboard the first aerial device and representative of a portion of the route that is beneath the first aerial device and/or generating third image data from a rearward-facing camera unit disposed onboard the first aerial device and representative of a portion of the route that is between the first aerial device and the non-aerial vehicle.

In one aspect, the method also can include communicating one or more of the second image data or the third image data to the one or more image analysis processors during flight of the first aerial device, and examining (using the one or more image analysis processors) the one or more of the second image data or the third image data to identify the hazard.

In one aspect, the hazard is identified by the one or more image analysis processors as at least one of a broken component of the route or an obstacle on the route based on the first image data.

In one aspect, the method also can include controlling the flight of the first aerial device by autonomously preventing the first aerial device from flying outside of a three dimensional movement envelope disposed ahead of the non-aerial vehicle during the movement of the non-aerial vehicle.

In one aspect, the non-aerial vehicle is a rail vehicle, the route is a track on which the rail vehicle is configured to travel, and the one or more image analysis processors are disposed onboard the rail vehicle. The method also can include wirelessly communicating the first image data to the one or more image analysis processors during flight of the first aerial device off of the rail vehicle, receiving the first image data generated by the first camera unit during flight of the first aerial device, and identifying at least one of a broken component of the track or an obstacle on the track based on comparing the first image data to a benchmark visual profile of the track.

In another embodiment, another system (e.g., another camera system) includes a first aerial device configured to land and dock to a non-aerial vehicle as the non-aerial vehicle moves along a route. The first aerial device also can be configured to fly off of the non-aerial vehicle and fly ahead of the non-aerial vehicle along a direction of travel of the non-aerial vehicle along the route. The system also can include a first camera unit configured to be disposed onboard the first aerial device and to generate first image data representative of a portion of the route ahead of the non-aerial vehicle during movement of the non-aerial vehicle along the route. The system also can include a second aerial device configured to land and dock to the non-aerial vehicle as the non-aerial vehicle moves along a route. The second aerial device also can be configured to fly off of the non-aerial vehicle and fly ahead of the non-aerial vehicle along the direction of travel of the non-aerial vehicle along the route. A second camera unit configured to be disposed onboard the second aerial device and to generate second image data representative of the portion of the route ahead of the non-aerial vehicle during movement of the non-aerial vehicle along the route also can be included in the system. The system can include one or more image analysis processors configured to be disposed onboard the non-aerial vehicle and to receive the first image data and the second image data. The one or more image analysis processors can be configured to identify a hazard along the route ahead of the non-aerial vehicle.

In one aspect, the one or more image analysis processors are configured to one or more of: generate a warning signal to notify an operator of the non-aerial vehicle of the hazard and/or automatically control movement of the non-aerial vehicle responsive to the hazard being identified.

In one aspect, only one of the first aerial device or the second aerial device flies off of the non-aerial vehicle at a time.

In one aspect, the system also can include a control unit configured to control flight of the first aerial device and the second aerial device. The control unit also can be configured to prevent the first aerial device and the second aerial device from flying outside of a three dimensional movement envelope defined ahead of the non-aerial vehicle.

In one aspect, the control unit is configured to change a size of the movement envelope based on one or more of a speed of the non-aerial vehicle, a coefficient of friction between the route and the non-aerial vehicle, a grade of the route, and/or a radius of curvature of the route.

In one aspect, the non-aerial vehicle is a rail vehicle, and the route is a track on which the rail vehicle is configured to travel. The one or more image analysis processors can be configured to be disposed onboard the rail vehicle and one or more of the first aerial device or the second aerial device is configured to wirelessly communicate one or more of the first image data or the second image data to the one or more image analysis processors during flight of the one or more of the first aerial device or the second aerial device off of the rail vehicle. The one or more image analysis processors also can be configured to receive the one or more of the first image data or the second image data generated by one or more of the first camera unit or the second camera unit during flight of the one or more of the first aerial device or the second aerial device and to identify at least one of a broken component of the track or an obstacle on the track based on comparing the one or more of the first image data or the second image data to a benchmark visual profile of the track.

The foregoing description of certain embodiments of the inventive subject matter will be better understood when read in conjunction with the appended drawings. To the extent that the FIGS. illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An antenna comprising:
   a radiating patch layer;
   an aperture layer, wherein the aperture layer is conductive and defines an aperture;
   a first insulator layer comprising a solid foam material sandwiched between the radiating patch layer and the aperture layer, wherein the radiating patch layer and the aperture layer are spaced apart from one another by at least a thickness of the first insulator layer, and wherein the first insulator layer has a low dielectric constant;
   a conductive feed line;
   a second insulator layer sandwiched between the aperture layer and the feed line;
   a ground plane layer;
   a third insulator layer sandwiched between the feed line and the ground plane layer, wherein the third insulator layer has a low dielectric constant, wherein the feed line extends from past a first outer edge of the aperture layer to past the aperture and terminates before a second outer edge of the aperture layer that is opposite the first outer edge; and
   a radome covering at least the radiating patch layer, wherein the radiating patch layer, the first insulator layer, the aperture layer, the second insulator layer, the conductive feed line, the third insulator layer, and the ground plane layer are all parallel to and stacked on top of one another.

2. The antenna of claim 1, wherein the first insulator layer has a dielectric constant of no more than 1.2.

3. The antenna of claim 2, wherein the third insulator layer has a dielectric constant of no more than 1.2 and comprises a same material as the solid foam material of the first insulator layer or a different solid foam material.

4. The antenna of claim 1, wherein the radiating patch layer and the aperture layer are spaced apart by at least 4 mm.

5. The antenna of claim 1, wherein the radiating patch layer, the aperture layer, and the ground plane layer are planar and have respective thicknesses of no more than $1/100$ of a respective minimum cross dimension of the radiating patch layer, the aperture layer, or the ground plane layer.

6. The antenna of claim 1, wherein the antenna has a passive gain based on an area and a shape of the aperture of the aperture layer, and wherein the shape, normal to a major planar surface of the aperture layer, is one of a slot, a bowtie, an H-shape, an E-shape, or an hour glass.

7. The antenna of claim 6, wherein the passive gain is at least 10 dB.

8. The antenna of claim 1, wherein the feed line comprises a metal conductor having a long axis oriented transverse to an axis of the aperture.

9. The antenna of claim 8, wherein the aperture is a rectangular slot, and the axis of the aperture is a long axis of the rectangular slot, wherein the long axis of the aperture is oriented transverse to the long axis of the metal conductor of the feed line.

10. The antenna of claim 1, wherein the first insulator layer is adhered to the radiating patch layer by a first bonded layer and to the aperture layer by a second bonded layer, and the third insulator layer is adhered to the feed line by a third bonded layer and to the ground plane layer by a fourth bonded layer; wherein the first bonded layer, second bonded layer, third bonded layer, and fourth bonded layer all have a respective low dielectric constant.

11. The antenna of claim 1, wherein the antenna has a polarity that has a difference of 10% or less when the antenna is oriented vertically versus being oriented horizontally.

12. The antenna of claim 1, wherein the antenna has a frequency bandwidth ranging from 5-50% octaves.

13. The antenna of claim 1, wherein the third insulator layer has a thickness corresponding to one-quarter of a wavelength of a frequency associated with the antenna.

14. The antenna of claim 1, wherein the feed line has a dimension corresponding to one-quarter of a wavelength of a frequency associated with the antenna.

15. The antenna of claim 1, wherein:
the radiating patch layer, the aperture layer, and the ground plane layer are planar and have respective thicknesses of no more than 1/100 of a respective minimum cross dimension of the radiating patch layer, the aperture layer, or the ground plane layer;
the radiating patch layer, the aperture layer, the first insulator layer, the conductive feed line, the second insulator layer, the ground plane layer, and the third insulator layer are all parallel to and stacked on top of one another;
the first insulator layer has a dielectric constant of no more than 1.2;
the third insulator layer has a dielectric constant of no more than 1.2 and comprises a same material as the solid foam material of the first insulator layer or a different solid foam material;
the radiating patch layer and the aperture layer are spaced apart by at least 4 mm;
the feed line comprises a metal conductor having a long axis oriented transverse to an axis of the aperture; and
the second insulator layer comprises a hydrocarbon ceramic laminate material.

16. A system, comprising:
an aerial vehicle configured to fly above a route;
a camera unit disposed onboard the aerial vehicle and configured to generate image data during flight of the aerial vehicle; and
a communication unit disposed onboard the aerial vehicle, the communication unit comprising the antenna of claim 1 and a transmitter, the communication unit configured to wirelessly communicate the image data to a location offboard the aerial vehicle.

17. An antenna comprising:
a radiating patch layer;
an aperture layer, wherein the aperture layer is conductive and defines an aperture;
a first insulator layer sandwiched between the radiating patch layer and the aperture layer, wherein the radiating patch layer and the aperture layer are spaced apart from one another by at least a thickness of the first insulator layer, and wherein the first insulator layer has a low dielectric constant;
a feed line that extends from past a first outer edge of the aperture layer to past the aperture and terminates before a second outer edge of the aperture layer that is opposite the first outer edge; and
a second insulator layer sandwiched between the aperture layer and the feed line, wherein the radiating patch layer, the first insulator layer, the aperture layer, the second insulator layer, and the feed line are parallel to and stacked on top of one another.

18. A system, comprising:
an aerial vehicle configured to fly above a route;
a camera unit disposed onboard the aerial vehicle and configured to generate image data during flight of the aerial vehicle; and
a communication unit disposed onboard the aerial vehicle, the communication unit comprising the antenna of claim 17 and a transmitter, the communication unit configured to wirelessly communicate the image data to a location offboard the aerial vehicle.

19. An antenna comprising:
a planar radiating patch layer, wherein the radiating patch layer is made of a first conductive metal;
a planar aperture layer, wherein the aperture layer is made of a second conductive metal and defines an aperture;
a first planar insulator layer sandwiched between the radiating patch layer and the aperture layer, wherein the radiating patch layer and the aperture layer are spaced apart from one another by at least a thickness of the first insulator layer, wherein the first insulator layer has a dielectric constant of no more than 1.5, and wherein there are no conductive elements disposed between the radiating patch layer and the aperture layer;
a conductive feed line, wherein a long axis of the conductive feed line is transverse to a long axis of the aperture, and wherein the feed line extends from past a first outer edge of the aperture layer to past the aperture, the feed line terminating before a second outer edge of the aperture layer that is opposite the first outer edge;
a second planar insulator layer sandwiched between the aperture layer and the feed line, wherein there are no conductive elements disposed between the feed line and the aperture layer, the second planar insulator layer comprises a hydrocarbon ceramic laminate material;
a planar ground plane layer made of a third conductive metal;
a third planar insulator layer sandwiched between the feed line and the ground plane layer, wherein the third insulator layer has a dielectric constant of no more than 1.5, and wherein there are no conductive elements disposed between the feed line and the ground plane layer; and
a radome covering at least the radiating patch layer,
wherein the radiating patch layer, the first insulator layer, the aperture layer, the second insulator layer, the conductive feed line, the third insulator layer, and the ground plane layer are all parallel to and stacked on top of one another.

20. The antenna of claim 19, wherein the aperture is rectangular, wherein the first planar insulator layer and the third planar insulator layer comprise a solid foam material, and wherein a thickness of the third planar insulator layer is equal to one-quarter of a wavelength of a frequency associated with the antenna.

* * * * *